(12) United States Patent
Suzuki et al.

(10) Patent No.: US 9,445,406 B2
(45) Date of Patent: Sep. 13, 2016

(54) WIRELESS COMMUNICATION OF CHANNEL STATE INFORMATION USING A SINGLE PHYSICAL UPLINK CHANNEL

(71) Applicant: Sharp Kabushiki Kaisha, Osaka-shi, Osaka (JP)

(72) Inventors: Shoichi Suzuki, Osaka (JP); Tatsushi Aiba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 47 days.

(21) Appl. No.: 14/359,372

(22) PCT Filed: Nov. 21, 2012

(86) PCT No.: PCT/JP2012/080116
§ 371 (c)(1),
(2) Date: May 20, 2014

(87) PCT Pub. No.: WO2013/077339
PCT Pub. Date: May 30, 2013

(65) Prior Publication Data
US 2014/0328304 A1    Nov. 6, 2014

(30) Foreign Application Priority Data
Nov. 24, 2011    (JP) .................................. 2011-255681

(51) Int. Cl.
*H04W 72/04*    (2009.01)
*H04L 5/00*    (2006.01)
(Continued)

(52) U.S. Cl.
CPC ....... *H04W 72/0413* (2013.01); *H04B 7/0626* (2013.01); *H04L 5/001* (2013.01);
(Continued)

(58) Field of Classification Search
CPC ................... H04W 72/0413; H04W 72/1242; H04W 72/1257; H04W 72/1226; H04W 74/0841; H04W 28/042; H04L 5/0057; H04L 5/0094; H04L 5/001; H04L 5/0082; H04L 5/0023; H04L 5/0048; H04B 7/0626
See application file for complete search history.

(56) References Cited

U.S. PATENT DOCUMENTS

2011/0242982 A1    10/2011  Lunttila et al.
2012/0076028 A1*    3/2012  Ko ........................ H04L 1/0026
                                                                370/252
(Continued)

FOREIGN PATENT DOCUMENTS

EP            2 555 555 A2    2/2013
WO      2010/148319 A1    12/2010
WO      2011/122911 A2    10/2011

OTHER PUBLICATIONS

3rd Generation Partnership Project; Technical Specification Group Radio Access Network; Evolved Universal Terrestrial Radio Access (E-UTRA); Physical Layer Procedures (Release 10), 3GPP TS 36.213, V10.3.0, Sep. 2011, 122 pages.
(Continued)

*Primary Examiner* — Joshua Kading
(74) *Attorney, Agent, or Firm* — Keating & Bennett, LLP

(57) ABSTRACT

If a plurality of channel state information reports corresponding to different cells have collided (Yes in step S2408), a mobile station device 1 selects two channel state information reports in accordance with priorities of report types and cell indices of cells, and drops the other channel state information reports (step S2412). The mobile station device 1 transmits the selected two channel state information reports using a resource for PUCCH format 3, which is used in case of collision of a plurality of channel state information reports corresponding to different cells (step S2414).

8 Claims, 21 Drawing Sheets

(51) Int. Cl.
*H04W 72/12* (2009.01)
*H04B 7/06* (2006.01)
*H04W 28/04* (2009.01)
*H04W 74/08* (2009.01)

(52) U.S. Cl.
CPC .......... *H04L 5/0057* (2013.01); *H04L 5/0094* (2013.01); *H04W 72/1226* (2013.01); *H04W 72/1242* (2013.01); *H04W 72/1257* (2013.01); *H04L 5/0023* (2013.01); *H04L 5/0048* (2013.01); *H04L 5/0082* (2013.01); *H04W 28/042* (2013.01); *H04W 74/0841* (2013.01)

(56) References Cited

U.S. PATENT DOCUMENTS

| | | | | |
|---|---|---|---|---|
| 2012/0120817 | A1* | 5/2012 | Khoshnevis | H04L 1/0026 370/252 |
| 2012/0207109 | A1* | 8/2012 | Pajukoski | H04L 1/0029 370/329 |
| 2012/0220286 | A1* | 8/2012 | Chen | H04W 24/10 455/422.1 |
| 2013/0083707 | A1* | 4/2013 | Wang | H04W 72/1289 370/280 |
| 2013/0114455 | A1* | 5/2013 | Yoo | H04W 24/00 370/252 |
| 2014/0286296 | A1* | 9/2014 | Tiirola | H04L 5/001 370/329 |

OTHER PUBLICATIONS

Official Communication issued in International Patent Application No. PCT/JP2012/080116, mailed on Dec. 18, 2012.

Huawei et al., 3GPP TSG RAN WG1 meeting #67, R1-113630, "Design and evaluation for CSI signalling enhancement", San Francisco, CA, Nov. 14-18, 2011, 6 pages.

* cited by examiner

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |

| u | $r'_{u,v}(0),...,r'_{u,v}(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

FIG. 16

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

FIG. 19

| | CELL 0 | CELL 1 | CELL 2 | CELL 3 |
|---|---|---|---|---|
| RESOURCE FOR PUCCH FORMAT 2 | RESOURCE 1 | RESOURCE 2 | RESOURCE 3 | RESOURCE 4 |
| REPORTING MODE | 2-0 | 2-0 | 1-0 | 1-0 |
| OFFSET OF WIDEBAND/SUB-BAND CQI | 2ms | 2ms | 8ms | 8ms |
| PERIOD OF WIDEBAND CQI | 25ms | 15ms | 20ms | 10ms |
| PERIOD OF SUB-BAND CQI | 5ms | 5ms | – | – |
| OFFSET OF RI | 2ms | 2ms | 1ms | 0ms |
| PERIOD OF RI | 50ms | 30ms | 40ms | 40ms |

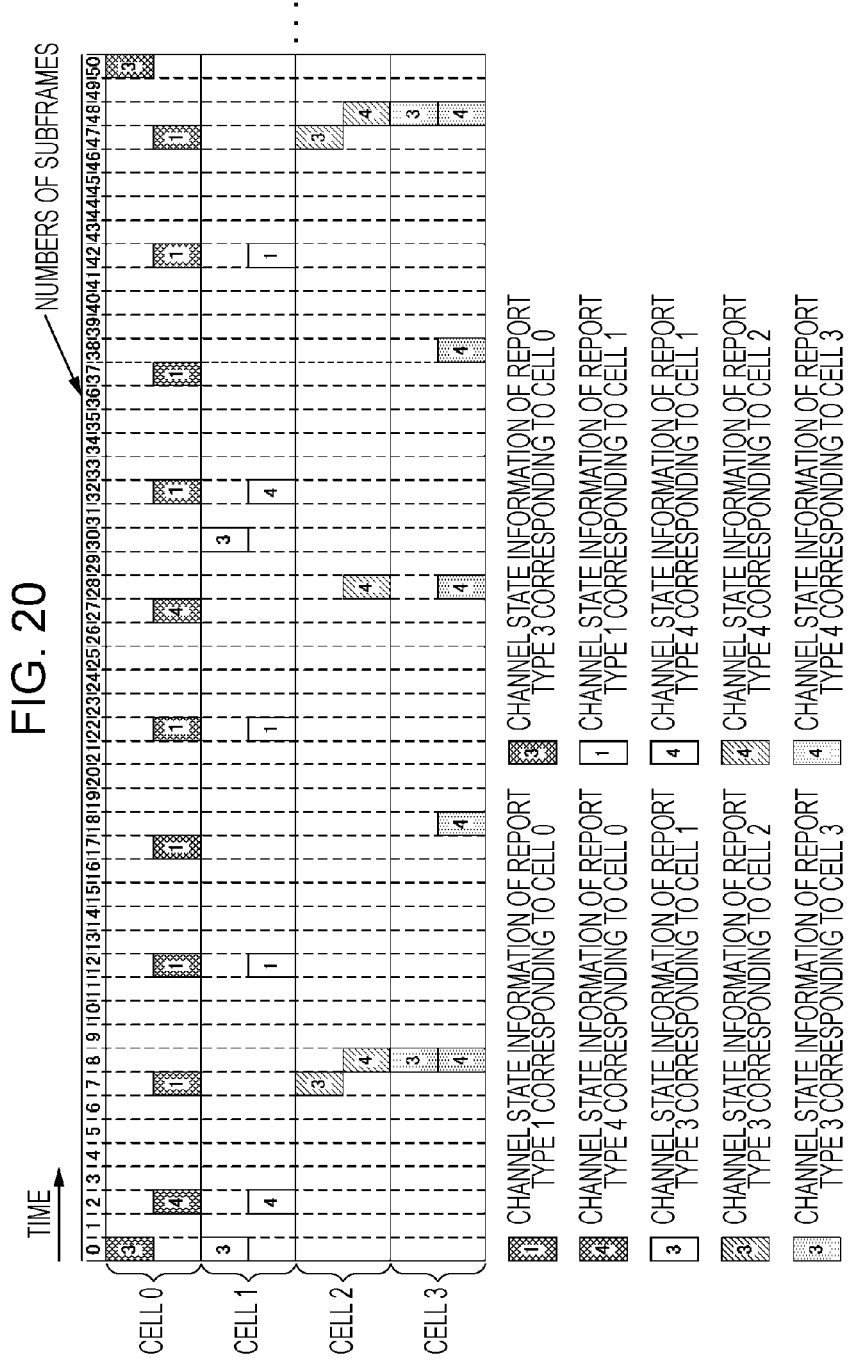

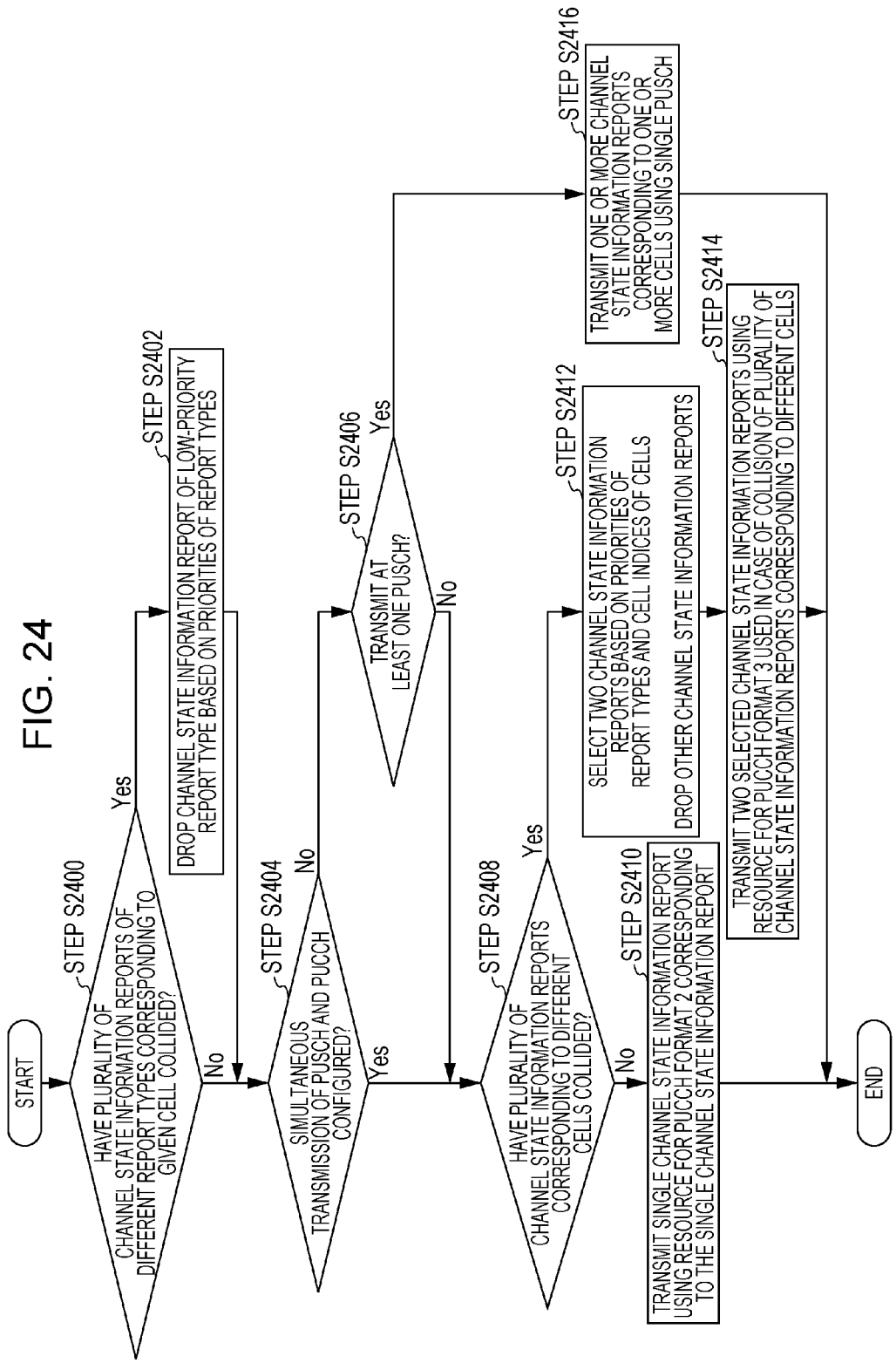

FIG. 25

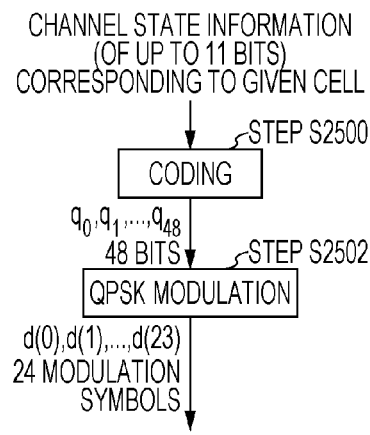

CHANNEL STATE INFORMATION
(OF UP TO 11 BITS)
CORRESPONDING TO GIVEN CELL
↓ ┌STEP S2500
[CODING]
$q_0, q_1, ..., q_{48}$
48 BITS ↓ ┌STEP S2502
[QPSK MODULATION]
$d(0), d(1), ..., d(23)$
24 MODULATION
SYMBOLS ↓

FIG. 26

|  | CELL 0 | CELL 1 | CELL 2 | CELL 3 |
|---|---|---|---|---|
| PUCCH FORMAT | 3 | 2 | 3 | 2 |
| REPORTING MODE | 2-0 | 2-0 | 1-0 | 1-0 |
| RESOURCE FOR PUCCH FORMAT 2/3 | RESOURCE 1 | RESOURCE 2 | RESOURCE 3 | RESOURCE 4 |
| OFFSET OF WIDEBAND SUB-BAND CQI | 2ms | 2ms | 8ms | 8ms |
| PERIOD OF WIDEBAND CQI | 25ms | 15ms | 20ms | 10ms |
| PERIOD OF SUB-BAND CQI | 5ms | 5ms | - | - |
| OFFSET OF RI | 2ms | 2ms | 1ms | 0ms |
| PERIOD OF RI | 50ms | 30ms | 40ms | 40ms |

WIRELESS COMMUNICATION OF CHANNEL STATE INFORMATION USING A SINGLE PHYSICAL UPLINK CHANNEL

TECHNICAL FIELD

The present invention relates to a mobile station device, a base station device, a wireless communication system, a wireless communication method, and an integrated circuit.

BACKGROUND ART

Evolved radio access schemes and radio networks for cellular mobile communication (hereinafter referred to as "Long Term Evolution (LTE)" or "Evolved Universal Terrestrial Radio Access (EUTRA)") are being studied by the 3rd Generation Partnership Project (3GPP). In LTE, the orthogonal frequency division multiplexing (OFDM) scheme is used as a communication scheme for the downlink from a base station device to a mobile station device. Furthermore, the SC-FDMA (Single-Carrier Frequency Division Multiple Access) scheme is used as a communication scheme for the uplink from a mobile station device to a base station device. Here, in LTE, a base station device is also called eNodeB (evolved NodeB), and a mobile station device is also called UE (User Equipment). LTE is a cellular communication system in which a plurality of areas, each of which is covered by a base station device, are arranged in a cellular configuration.

In LTE, a mobile station device calculates channel state information on the basis of a downlink reference signal received from a base station device. The mobile station device transmits the channel state information to the base station device using a physical uplink control channel (PUCCH) or a physical uplink shared channel (PUSCH).

In LTE, a base station device schedules a physical downlink shared channel (PDSCH) in accordance with channel state information received from a mobile station device. Further, the base station device transmits information indicating the result of scheduling to the mobile station device using a physical downlink control channel (PUCCH). The mobile station device performs a reception process for the PDSCH in accordance with the received information indicating the result of scheduling.

In LTE, a technology for providing communication between a mobile station device and a base station device using a plurality of cells (component carriers) having the same channel structure (also referred to as cell aggregation or carrier aggregation) is used. For example, in communication using cell aggregation, a mobile station device and a base station device can simultaneously transmit and receive a plurality of physical channels using a plurality of cells. For example, after the initial connection is established between a mobile station device and a base station device within one cell, the base station device can add a cell to be used for communication with the mobile station device.

In LTE, a base station device can configure, for a mobile station device, periodic channel state information reports for a plurality of cells. The base station device transmits information indicating the configured periodic channel state information reports for the plurality of cells to the mobile station device. The mobile station device configures the periodic channel state information reports for the plurality of cells on the basis of the information indicating the configured periodic channel state information reports for the plurality of cells. The mobile station device for which the periodic channel state information reports for the plurality of cells have been configured periodically transmits channel state information corresponding to each of the plurality of cells using the PUCCH. If periodic transmissions of a plurality of pieces of channel state information have collided in a given subframe, the mobile station device transmits one of the plurality of pieces of channel state information to the base station device, and drops (does not transmit) the other pieces of channel state information. Thus, the base station device is not able to schedule the PDSCH on the basis of channel state information for the cells corresponding to the channel state information that the mobile station device has dropped. Accordingly, a problem occurs in that efficient scheduling of the PDSCH is not achievable.

In 3GPP, the transmission of a plurality of pieces of channel state information using new PUCCH formats or a PUSCH is being studied.

CITATION LIST

Non Patent Literature

NPL 1: "Design and evaluation for CSI signalling enhancement", R1-113630, 3GPP TSG-RAN WG1 Meeting #67, San Francisco, USA, 14-18 Nov. 2011.

SUMMARY OF INVENTION

Technical Problem

However, a mobile station device always occupies PUCCH or PUSCH resources on which a plurality of pieces of channel state information can be transmitted, causing a problem in that resource allocation efficiency will be reduced.

The present invention has been made in view of the foregoing situations, and it is an object of the present invention to provide a mobile station device, a base station device, a wireless communication system, a wireless communication method, and an integrated circuit that enable efficient communication of one or a plurality of pieces of channel state information using a single physical uplink channel.

Solution to Problem (1) In order to achieve the foregoing object, the present invention takes the following solutions: A mobile station device of the present invention is a mobile station device for communicating with a base station device using a plurality of cells, and is operable to configure a resource for a physical uplink control channel of a first format that is usable for one report of channel state information, for each of the plurality of cells in accordance with information received from the base station device. The mobile station device of the present invention is further operable to configure a periodic report of the channel state information using the resource for the physical uplink control channel of the first format, for each of the plurality of cells in accordance with the information received from the base station device. The mobile station device of the present invention is further operable to configure one resource for a physical uplink control channel of a second format that is usable for a plurality of reports of the channel state information in accordance with the information received from the base station device. Furthermore, the mobile station device of the present invention is operable to transmit, in case of collision of a plurality of reports of the channel state information using the physical uplink control channel of the first format in a given subframe, some or all of the plurality of colliding reports of the channel state information to the base station device using the resource for the physical uplink control channel of the second format.

(2) Furthermore, a base station device of the present invention is a base station device for communicating with a mobile station device using a plurality of cells, and is operable to configure a resource for a physical uplink control channel of a first format that is usable for one report of channel state information, for each of the plurality of cells. The base station device of the present invention is further operable to configure a periodic report of the channel state information using the physical uplink control channel of the first format for each of the plurality of cells. The base station device of the present invention is further operable to configure one resource for a physical uplink control channel of a second format that is usable for a plurality of reports of the channel state information. Furthermore, the base station device of the present invention is operable to receive, in case of collision of a plurality of reports of the channel state information using the physical uplink control channel of the first format in a given subframe, some or all of the plurality of colliding reports of the channel state information from the mobile station device using the resource for the physical uplink control channel of the second format.

(3) Furthermore, a wireless communication system of the present invention is a wireless communication system in which a mobile station device and a base station device communicate with each other using a plurality of cells. The base station device is operable to configure a resource for a physical uplink control channel of a first format that is usable for one report of channel state information, for each of the plurality of cells. The base station device is further operable to configure a periodic report of the channel state information using the physical uplink control channel of the first format for each of the plurality of cells. The base station device is further operable to configure one resource for a physical uplink control channel of a second format that is usable for a plurality of reports of the channel state information. The mobile station device is operable to transmit, in case of collision of a plurality of reports of the channel state information using the physical uplink control channel of the first format in a given subframe, some or all of the plurality of colliding reports of the channel state information to the base station device using the resource for the physical uplink control channel of the second format.

(4) Furthermore, a wireless communication method of the present invention is a wireless communication method used in a mobile station device for communicating with a base station device using a plurality of cells, including configuring a resource for a physical uplink control channel of a first format that is usable for one report of channel state information, for each of the plurality of cells in accordance with information received from the base station device. The wireless communication method of the present invention further includes configuring a periodic report of the channel state information using the resource for the physical uplink control channel of the first format, for each of the plurality of cells in accordance with the information received from the base station device. The wireless communication method of the present invention further includes configuring one resource for a physical uplink control channel of a second format that is usable for a plurality of reports of the channel state information in accordance with the information received from the base station device. The wireless communication method of the present invention further includes transmitting, in case of collision of a plurality of reports of the channel state information using the physical uplink control channel of the first format in a given subframe, some or all of the plurality of colliding reports of the channel state information to the base station device using the resource for the physical uplink control channel of the second format.

(5) Furthermore, a wireless communication method of the present invention is a wireless communication method used in a base station device for communicating with a mobile station device using a plurality of cells, including configuring a resource for a physical uplink control channel of a first format that is usable for one report of channel state information, for each of the plurality of cells. The wireless communication method of the present invention further includes configuring a periodic report of the channel state information using the physical uplink control channel of the first format for each of the plurality of cells. The wireless communication method of the present invention further includes configuring one resource for a physical uplink control channel of a second format that is usable for a plurality of reports of the channel state information. The wireless communication method of the present invention further includes receiving, in case of collision of a plurality of reports of the channel state information using the physical uplink control channel of the first format in a given subframe, some or all of the plurality of colliding reports of the channel state information from the mobile station device using the resource for the physical uplink control channel of the second format.

(6) Furthermore, an integrated circuit of the present invention is an integrated circuit used in a mobile station device for communicating with a base station device using a plurality of cells, and is operable to configure a resource for a physical uplink control channel of a first format that is usable for one report of channel state information, for each of the plurality of cells in accordance with information received from the base station device. The integrated circuit of the present invention is further operable to configure a periodic report of the channel state information using the resource for the physical uplink control channel of the first format, for each of the plurality of cells in accordance with the information received from the base station device. The integrated circuit of the present invention is further operable to configure one resource for a physical uplink control channel of a second format that is usable for a plurality of reports of the channel state information in accordance with the information received from the base station device. The integrated circuit of the present invention is further operable to transmit, in case of collision of a plurality of reports of the channel state information using the physical uplink control channel of the first format in a given subframe, some or all of the plurality of colliding reports of the channel state information to the base station device using the resource for the physical uplink control channel of the second format.

(7) Furthermore, an integrated circuit of the present invention is an integrated circuit used in a base station device for communicating with a mobile station device using a plurality of cells, and is operable to configure a resource for a physical uplink control channel of a first format that is usable for one report of channel state information, for each of the plurality of cells. The integrated circuit of the present invention is further operable to configure a periodic report of the channel state information using the physical uplink control channel of the first format for each of the plurality of cells. The integrated circuit of the present invention is further operable to configure one resource for a physical uplink control channel of a second format that is usable for a plurality of reports of the channel state information. The integrated circuit of the present invention is further operable to receive, in case of collision of a plurality of reports of the channel state information using the physical uplink control channel of the first format in a given subframe, some or all of the plurality of colliding reports of the channel state information from the mobile station device using the resource for the physical uplink control channel of the second format.

(8) Furthermore, a mobile station device of the present invention is a mobile station device for communicating with a base station device using a plurality of cells, and is operable to configure either a resource for a physical uplink control channel of a first format that is usable for one report of channel state information or a resource for a physical uplink control channel of a second format that is usable for a plurality of reports of the channel state information, for each of the plurality of cells in accordance with information received from the base station device. The mobile station device of the present invention is further operable to configure a periodic report of the channel state information using the physical uplink control channel of the first format or a periodic report of the channel state information using the physical uplink control channel of the second format, for each of the plurality of cells in accordance with the information received from the base station device. The mobile station device of the present invention is further operable to transmit, in case of collision of one or more reports of the channel state information using the physical uplink control channel of the first format and one or more reports of the channel state information using the physical uplink control channel of the second format in a given subframe, some or all of the plurality of colliding reports of the channel state information to the base station device using the resource for the physical uplink control channel of the second format.

(9) Furthermore, a base station device of the present invention is a base station device for communicating with a mobile station device using a plurality of cells, and is operable to configure either a resource for a physical uplink control channel of a first format that is usable for one report of channel state information or a resource for a physical uplink control channel of a second format that is usable for a plurality of reports of the channel state information, for each of the plurality of cells. The base station device of the present invention is further operable to configure a periodic report of the channel state information using the physical uplink control channel of the first format or a periodic report of the channel state information using the physical uplink control channel of the second format, for each of the plurality of cells. The base station device of the present invention is further operable to receive, in case of collision of one or more reports of the channel state information using the physical uplink control channel of the first format and one or more reports of the channel state information using the physical uplink control channel of the second format in a given subframe, some or all of the plurality of colliding reports of the channel state information from the mobile station device using the resource for the physical uplink control channel of the second format.

(10) Furthermore, a wireless communication system of the present invention is a wireless communication system in which a mobile station device and a base station device communicate with each other using a plurality of cells. The base station device is operable to configure either a resource for a physical uplink control channel of a first format that is usable for one report of channel state information or a resource for a physical uplink control channel of a second format that is usable for a plurality of reports of the channel state information, for each of the plurality of cells. The base station device is further operable to configure a periodic report of the channel state information using the physical uplink control channel of the first format or a periodic report of the channel state information using the physical uplink control channel of the second format, for each of the plurality of cells. The mobile station device is operable to transmit, in case of collision of one or more reports of the channel state information using the physical uplink control channel of the first format and one or more reports of the channel state information using the physical uplink control channel of the second format in a given subframe, some or all of the plurality of colliding reports of the channel state information to the base station device using a resource for a single physical uplink control channel of the second format.

(11) Furthermore, a wireless communication method of the present invention is a wireless communication method used in a mobile station device for communicating with a base station device using a plurality of cells, including configuring either a resource for a physical uplink control channel of a first format that is usable for one report of channel state information or a resource for a physical uplink control channel of a second format that is usable for a plurality of reports of the channel state information, for each of the plurality of cells in accordance with information received from the base station device. The wireless communication method of the present invention further includes configuring a periodic report of the channel state information using the physical uplink control channel of the first format or a periodic report of the channel state information using the physical uplink control channel of the second format, for each of the plurality of cells in accordance with the information received from the base station device. The wireless communication method of the present invention further includes transmitting, in case of collision of one or more reports of the channel state information using the physical uplink control channel of the first format and one or more reports of the channel state information using the physical uplink control channel of the second format in a given subframe, some or all of the plurality of colliding reports of the channel state information to the base station device using the resource for the physical uplink control channel of the second format.

(12) Furthermore, a wireless communication method of the present invention is a wireless communication method used in a base station device for communicating with a mobile station device using a plurality of cells, including configuring either a resource for a physical uplink control channel of a first format that is usable for one report of channel state information or a resource for a physical uplink control channel of a second format that is usable for a plurality of reports of the channel state information, for each of the plurality of cells. The wireless communication method of the present invention further includes configuring a periodic report of the channel state information using the physical uplink control channel of the first format or a periodic report of the channel state information using the physical uplink control channel of the second format, for each of the plurality of cells. The wireless communication method of the present invention further includes receiving, in case of collision of one or more reports of the channel state information using the physical uplink control channel of the first format and one or more reports of the channel state information using the physical uplink control channel of the second format in a given subframe, some or all of the plurality of colliding reports of the channel state information from the mobile station device using the resource for the physical uplink control channel of the second format.

(13) Furthermore, an integrated circuit of the present invention is an integrated circuit used in a mobile station device for communicating with a base station device using a plurality of cells, and is operable to configure either a resource for a physical uplink control channel of a first format that is usable for one report of channel state information or a resource for a physical uplink control channel of a second format that is usable for a plurality of reports of the channel state information, for each of the plurality of cells in accordance with information received from the base station device. The integrated circuit of the present invention is further operable to configure a periodic report of the channel state information using the physical uplink control channel of the first format or a periodic report of the channel state information using the physical uplink control channel of the second format, for each of the plurality of cells in accordance with the information received from the base station device. The integrated circuit of the present invention is further operable to transmit, in case of collision of one or more reports of the channel state information using the physical uplink control channel of the first format and one or more reports of the channel state information using the physical uplink control channel of the second format in a given subframe, some or all of the plurality of colliding reports of the channel state information to the base station device using the resource for the physical uplink control channel of the second format.

(14) Furthermore, an integrated circuit of the present invention is an integrated circuit used in a base station device for communicating with a mobile station device using a plurality of cells, and is operable to configure either a resource for a physical uplink control channel of a first format that is usable for one report of channel state information or a resource for a physical uplink control channel of a second format that is usable for a plurality of reports of the channel state information, for each of the plurality of cells. The integrated circuit of the present invention is further operable to configure a periodic report of the channel state information using the physical uplink control channel of the first format or a periodic report of the channel state information using the physical uplink control channel of the second format, for each of the plurality of cells. The integrated circuit of the present invention is further operable to receive, in case of collision of one or more reports of the channel state information using the physical uplink control channel of the first format and one or more reports of the channel state information using the physical uplink control channel of the second format in a given subframe, some or all of the plurality of colliding reports of the channel state information from the mobile station device using the resource for the physical uplink control channel of the second format.

Advantageous Effects of Invention

According to this invention, a mobile station device and a base station device can efficiently communicate one or a plurality of pieces of channel state information to each other using a single physical uplink channel.

BRIEF DESCRIPTION OF DRAWINGS

FIG. 16 is a diagram illustrating an example of sequences $M_{i,n}$ used for the encoding of channel state information that is transmitted on PUCCH format 3 of the present embodiment.

FIG. 19 is a diagram illustrating an example of configured periodic channel state information for cells 0 through 3 of the present embodiment.

FIG. 20 is a diagram illustrating an example of the timing of channel state information reports of the present embodiment.

FIG. 21 is a diagram illustrating a first example of the correspondences between channel state information reports and physical uplink control channel resources of the present embodiment.

FIG. 24 is a flowchart diagram illustrating a process for determining a resource to be used for channel state information reporting of the present embodiment.

FIG. 25 is a diagram illustrating an example of the encoding and modulation of a single piece of channel state information that is transmitted using PUCCH format 3 of a second embodiment.

FIG. 26 is a diagram illustrating an example of configured periodic channel state information for cells 0 through 3 of the second embodiment.

DESCRIPTION OF EMBODIMENTS

First, physical channels of the present embodiment will be described.

Figure 1:
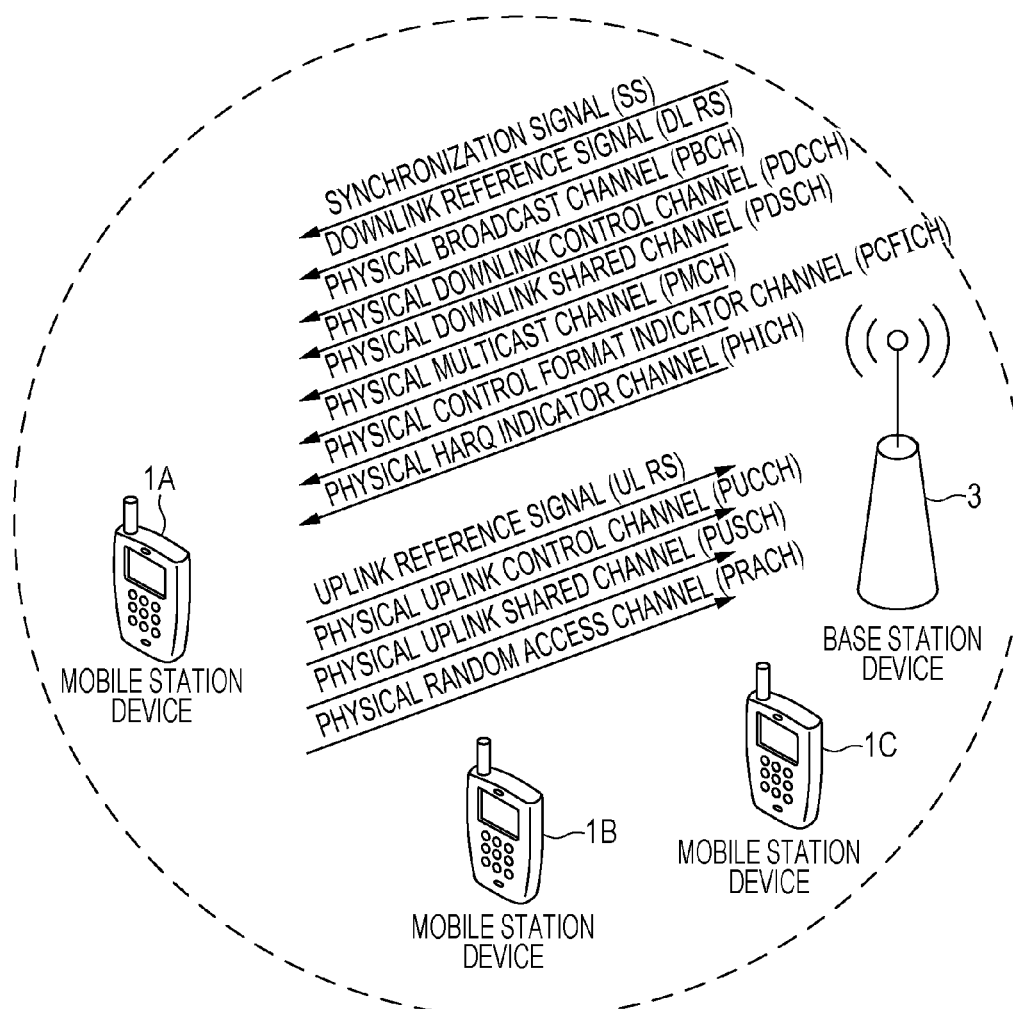
FIG. 1 is a conceptual diagram of a wireless communication system of the present embodiment.

FIG. 1 is a conceptual diagram of a wireless communication system of the present embodiment. In FIG. 1, the wireless communication system includes mobile station devices 1A to 1C and a base station device 3. In the illustration of FIG. 1, a synchronization signal (SS), a downlink reference signal (DL RS), a physical broadcast channel (PBCH), a physical downlink control channel (PDCCH), a physical downlink shared channel (PDSCH), a physical multicast channel (PMCH), a physical control format indicator channel (PCFICH), and a physical HARQ indicator channel (Physical Hybrid ARQ Indicator Channel) (PHICH) are used in wireless communication in the downlink from the base station device 3 to the mobile station devices 1A to 1C.

In the illustration of FIG. 1, furthermore, an uplink reference signal (UL RS), a physical uplink control channel (PUCCH), a physical uplink shared channel (PUSCH), and a physical random access channel (PRACH) are used in wireless communication in the uplink from the mobile station devices 1A to 1C to the base station device 3. In the following, the mobile station devices 1A to 1C are referred to as the mobile station devices 1 or individually referred to as the mobile station device 1.

The synchronization signal is used by the mobile station device 1 to achieve synchronization in the frequency domain and the time domain for the downlink. The downlink reference signal is used by the mobile station device 1 to achieve synchronization in the frequency domain and the time domain for the downlink. The downlink reference signal is further used by the mobile station device 1 to calculate channel state information for the downlink. The downlink reference signal is further used by the mobile station device 1 for channel correction of the PDSCH or PDCCH. The PBCH is a physical channel used to broadcast system information (master information block, Broadcast Channel: BCH) that is commonly used by the mobile station devices 1. The PBCH is transmitted at intervals of 40 ms. The timing of the 40-ms intervals is blindly detected at the mobile station device 1. Further, the PBCH is retransmitted at intervals of 10 ms.

The PDCCH is a physical channel used for the transmission of downlink control information (DCI) such as a downlink assignment (or also referred to as a "downlink grant") or an uplink grant. The downlink assignment is downlink control information used for the scheduling of a single PDSCH in a single cell. The downlink assignment includes information related to a modulation scheme and coding rate (Modulation and Coding Scheme: MCS) for the PDSCH, information indicating the allocation of radio resources, a TPC command (Transmission Power Control command) for the PUCCH, and so forth. The uplink grant is downlink control information used for the scheduling of a single PDSCH in a single cell. The uplink grant includes information related to a modulation scheme and coding rate for the PUSCH, information indicating the allocation of radio resources, a TPC command for the PUSCH, and so forth.

The PDSCH is a physical channel used for the transmission of paging information (Paging Channel: PCH), system information, and downlink data (Downlink Shared Channel: DL-SCH). The system information transmitted on the PDSCH is referred to as a system information block. The system information block includes radio resource configuration information, which is common to a plurality of mobile station devices 1. The PMCH is a physical channel used for the transmission of MBMS (Multimedia Broadcast and Multicast Service) related information (Multicast Channel: MCH). The PCFICH is a physical channel used for the transmission of information indicating a region (OFDM symbols) onto which the PDSCH is mapped.

The PHICH is a physical channel used for the transmission of a HARQ indicator (response information) indicating success or failure of decoding of the uplink data received by the base station device 3. If the base station device 3 has succeeded in decoding the uplink data included in the PUSCH, ACK (ACKnowledgement) is set in the HARQ indicator in response to the uplink data. If the base station device 3 has failed to decode the uplink data included in the PUSCH, NACK (Negative ACKnowledgement) is set in the HARQ indicator in response to the uplink data. A single PHICH transmits a HARQ indicator in response to a single piece of uplink data. The base station device 3 transmits HARQ indicators in response to a plurality of pieces of uplink data included in the same PUSCH using a plurality of PHICHs.

The uplink reference signal is used by the base station device 3 to achieve synchronization in the time domain for the uplink. The uplink reference signal is further used by the base station device 3 to measure the quality of uplink reception. Furthermore, the uplink reference signal is used by the base station device 3 for channel correction of the PUSCH or PUCCH. The uplink reference signal includes a DMRS (Demodulation Reference Signal) that is time multiplexed with the PUSCH or PUCCH and is transmitted, and an SRS (Sounding Reference Signal) that is transmitted regardless of the PUSCH and PUCCH.

The PUCCH is a physical channel used for the transmission of uplink control information (UCI), which is information used for the control of communication, such as channel state information (CSI) for the downlink, a scheduling request (SR) indicating a radio resource request for the PUSCH, and ACK/NACK indicating success or failure of decoding of the downlink data received by the mobile station device 1. The channel state information includes a channel quality indicator (CQI), a precoding matrix indicator (PMI, also referred to as information indicating a precoder), a precoding type indicator (PTI), and/or a rank indicator (RI).

The PUCCH supports a plurality of formats. The formats supported by the PUCCH are termed PUCCH formats.

(A) For example, on-off keying is applied to PUCCH format 1 as the modulation scheme. The mobile station device 1 can transmit a scheduling request using PUCCH format 1.

(B) For example, BPSK (Binary Phase Shift Keying) is applied to PUCCH format 1a as the modulation scheme. The mobile station device 1 can transmit an ACK/NACK of 1 bit using PUCCH format 1a.

(C) For example, QPSK (Quadrature Phase Shift Keying) is applied to PUCCH format 1b as the modulation scheme. The mobile station device 1 can transmit an ACK/NACK of 2 bits using PUCCH format 1b.

(D) For example, QPSK is applied to PUCCH format 2 as the modulation scheme. The mobile station device 1 can transmit channel state information of up to 11 bits corresponding to a single cell using PUCCH format 2. In PUCCH format 2, convolutional coding is applied as the coding scheme. A coded bit sequence of 20 bits is generated using the convolutional coding.

(E) For example, QPSK is applied to PUCCH format 3 as the modulation scheme. The mobile station device 1 can transmit up to a predetermined number of pieces of channel state information corresponding to up to a predetermined number of cells and/or a plurality of ACKs/NACKs using PUCCH format 3. In PUCCH format 3, block coding is applied as the coding scheme. A coded bit sequence of 48 bits is generated using the block coding. In a case where only channel state information is to be transmitted using PUCCH format 3, channel state information of up to 22 bits can be transmitted. In a case where only an ACK/NACK is to be transmitted using PUCCH format 3, an ACK/NACK of up to 22 bits can be transmitted.

The PUSCH is a physical channel used for the transmission of uplink data (Uplink Shared Channel: UL-SCH) or uplink control information (ACK/NACK and/or channel state information). The PRACH is a physical channel used for the transmission of random access preambles. The chief purpose of the PRACH is to allow the mobile station device 1 to synchronize with the base station device 3 in the time domain. Additionally, the PRACH is used for the initial connection establishment procedure, the handover procedure, the connection re-establishment procedure, synchronization (timing adjustment) for uplink transmissions, and the request for the allocation of uplink radio resources.

The BCH, the UL-SCH, the DL-SCH, and the like are transport channels. The unit of transmission of UL-SCH on the PUSCH and the unit of transmission of DL-SCH on the PDSCH are referred to as a transport block (TB). The transport block is a unit of data which is delivered from the MAC (Media Access Control) layer to the physical layer. In the MAC layer, HARQ (retransmission) control is carried out for each transport block. In addition, the unit of data, such as UL-SCH and DL-SCH, which is handled in the MAC layer is also referred to as the MAC PDU (Protocol Data Unit). In the physical layer, a transport block is mapped to a codeword, and a coding process is performed for each codeword.

Cell aggregation (carrier aggregation) of the present embodiment will be described hereinafter.

Figure 2:
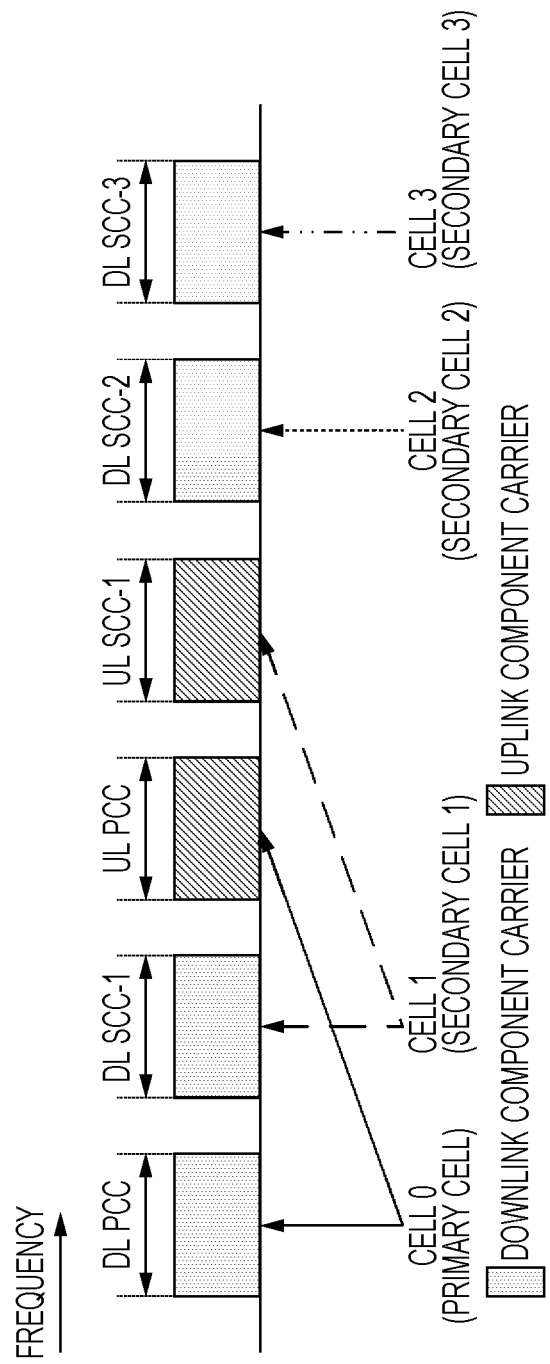
FIG. 2 is a diagram illustrating an example of cell aggregation of the present embodiment.

FIG. 2 is a diagram illustrating an example of cell aggregation of the present embodiment. In FIG. 2, the horizontal axis represents the frequency domain. In cell aggregation, a plurality of serving cells are aggregated together. In the following, a serving cell is referred to simply as a cell. In FIG. 2, four cells (cell 0, cell 1, cell 2, and cell 3) are aggregated together. One cell (cell 0 in FIG. 2) out of the plurality of cells to be aggregated together is the primary cell (Pcell). The primary cell is a cell within which the mobile station device 1 performed the initial connection establishment procedure, a cell within which the mobile station device 1 initiated the connection re-establishment procedure, or a cell designated as the primary cell during the handover procedure.

The cells (cell 1, cell 2, and cell 3 in FIG. 2) other than the primary cell are secondary cells (Scells). Secondary cells are used to provide additional radio resources. Secondary cells are used mainly for the transmission and reception of the PDSCH, PUSCH, and PRACH. Secondary cells operate at frequencies different from those of the primary cell. Secondary cells are added by the base station device 3 after the connection between the mobile station device 1 and the base station device 3 is established. Furthermore, the base station device 3 notifies the mobile station device 1 of secondary cells during the handover procedure. The mobile station device 1 transmits the PUCCH only on the primary cell, and does not transmit the PUCCH on a secondary cell. The mobile station device 1 may not necessarily receive paging and system information transmitted on the PBCH and PDSCH in a secondary cell.

The cell index of the primary cell is 0. The cell index of a secondary cell is any of 1 to 7. When adding a secondary cell, the base station device 3 transmits information indicating the cell index of the secondary cell to the mobile station device 1.

In FIG. 2, rectangular areas hatched with dots are downlink component carriers (DL CCs), and rectangular areas hatched with oblique lines extending from lower left to upper right are uplink component carriers (UL CCs). A carrier corresponding to a cell in the downlink is a downlink component carrier, and a carrier corresponding to a cell in the uplink is an uplink component carrier. A carrier corresponding to the primary cell in the downlink is a downlink primary component carrier (DL PCC), and a carrier corresponding to the primary cell in the uplink is an uplink primary component carrier (UL PCC). A carrier corresponding to a secondary cell in the downlink is a downlink secondary component carrier (DL SCC), and a carrier corresponding to a secondary cell in the uplink is an uplink secondary component carrier (UL SCC).

The primary cell is composed of a downlink component carrier and an uplink component carrier. A secondary cell is composed of a downlink primary component carrier and an uplink primary component carrier, or is composed only of a downlink component carrier. That is, a secondary cell is not composed only of an uplink component carrier. In FIG. 2, cell 0 and cell 1 are each composed of a downlink component carrier and an uplink component carrier. In FIG. 2, cell 2 and cell 3 are each composed only of a downlink component carrier.

Each of the physical channels is transmitted on any one cell. That is, a single physical channel is not transmitted over a plurality of cells. The mobile station device 1 transmits the PUCCH only on the primary cell. That is, the mobile station device 1 does not transmit the PUCCH on a secondary cell. That is, in FIG. 2, the mobile station device 1 transmits the PUCCH only on cell 0. The mobile station device 1 does not receive a plurality of PDSCHs in a single cell. Furthermore, the mobile station device 1 does not transmit a plurality of PUSCHs on a single cell. In addition, whether or not the mobile station device 1 is allowed to simultaneously transmit the PUCCH and the PUSCH is set by the base station device 3.

A configuration of a downlink radio frame of the present embodiment will be described hereinafter.

Figure 3:
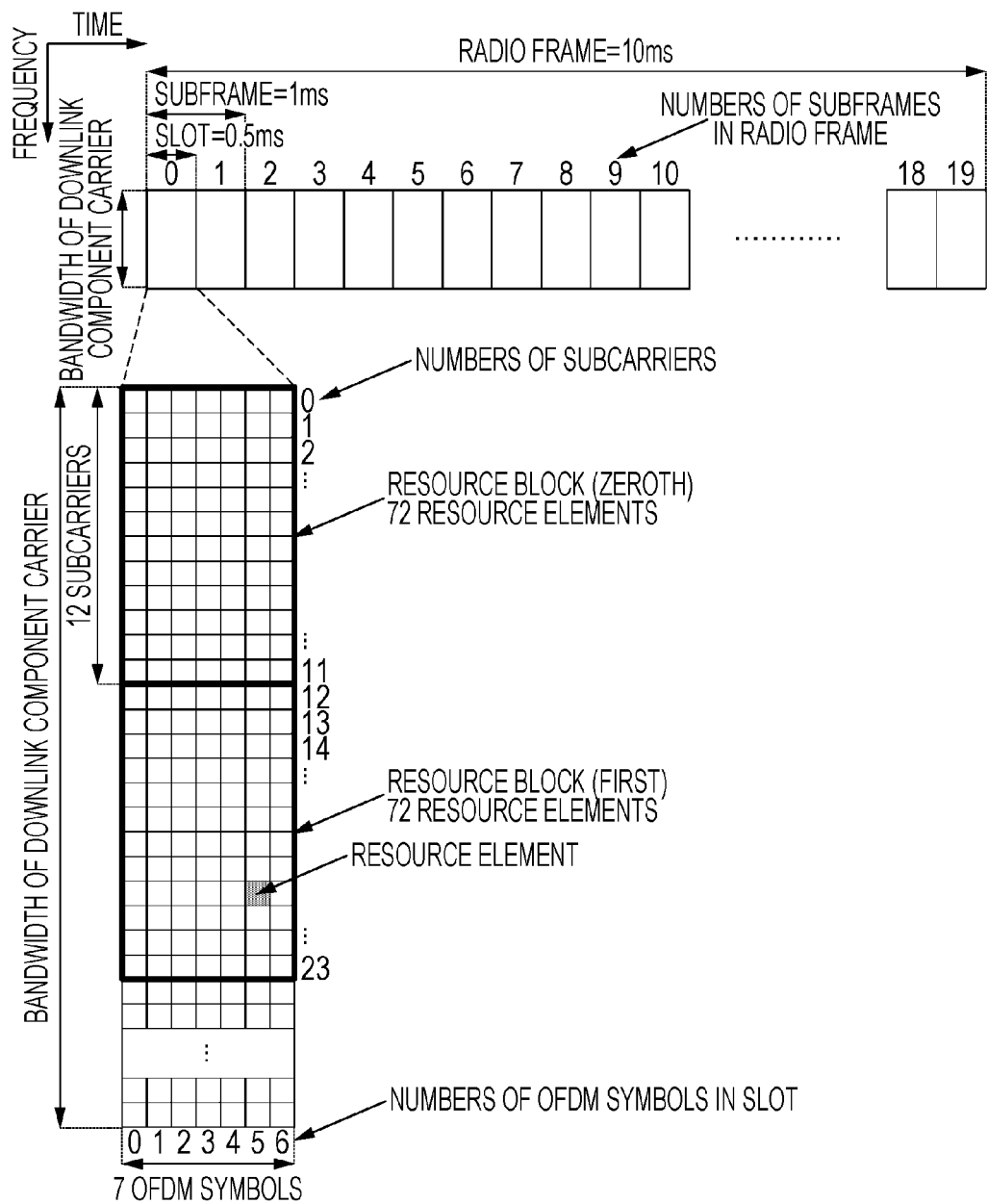
FIG. 3 is a diagram illustrating a schematic configuration of a radio frame on a downlink component carrier of the present embodiment.

FIG. 3 is a diagram illustrating a schematic configuration of a radio frame on a downlink component carrier of the present embodiment. In FIG. 3, the horizontal axis represents the time domain, and the vertical axis represents the frequency domain. Each radio frame is 10 ms long. In addition, each radio frame is composed of 20 slots. Each slot is 0.5 ms long. The slots in each radio frame are assigned numbers 0 to 19. Each subframe is 1 ms long. Each subframe is defined by two continuous slots. The i-th subframe in each radio frame is composed of the (2×i)-th slot and the (2×i+1)-th slot. That is, ten subframes can be utilized for each interval of 10 ms.

A signal or physical channel transmitted in each slot is expressed by a resource grid. The resource grid is defined by a plurality of subcarriers and a plurality of OFDM symbols. The number of subcarriers forming each slot depends on the bandwidth of the downlink component carrier. The number of OFDM symbols forming each slot is 7. Each of the elements in the resource grid is referred to as a resource element. A resource element is identified using a subcarrier number and an OFDM symbol number.

A resource block is used to represent the mapping of resource elements on a given physical downlink channel (such as the PDSCH). Virtual resource blocks and physical resource blocks are defined as resource blocks. A given physical downlink channel is initially mapped onto virtual resource blocks. Then, the virtual resource blocks are mapped onto physical resource blocks. One physical resource block is defined by 7 continuous OFDM symbols in the time domain and 12 contiguous subcarriers in the frequency domain. Thus, one physical resource block is composed of (7×12) resource elements. Furthermore, one physical resource block corresponds to one slot in the time domain, and corresponds to 180 kHz in the frequency domain. Physical resource blocks are assigned numbers, starting from 0, in the frequency domain.

An example of the mapping of a downlink reference signal of the present embodiment will be described hereinafter.

Figure 4:
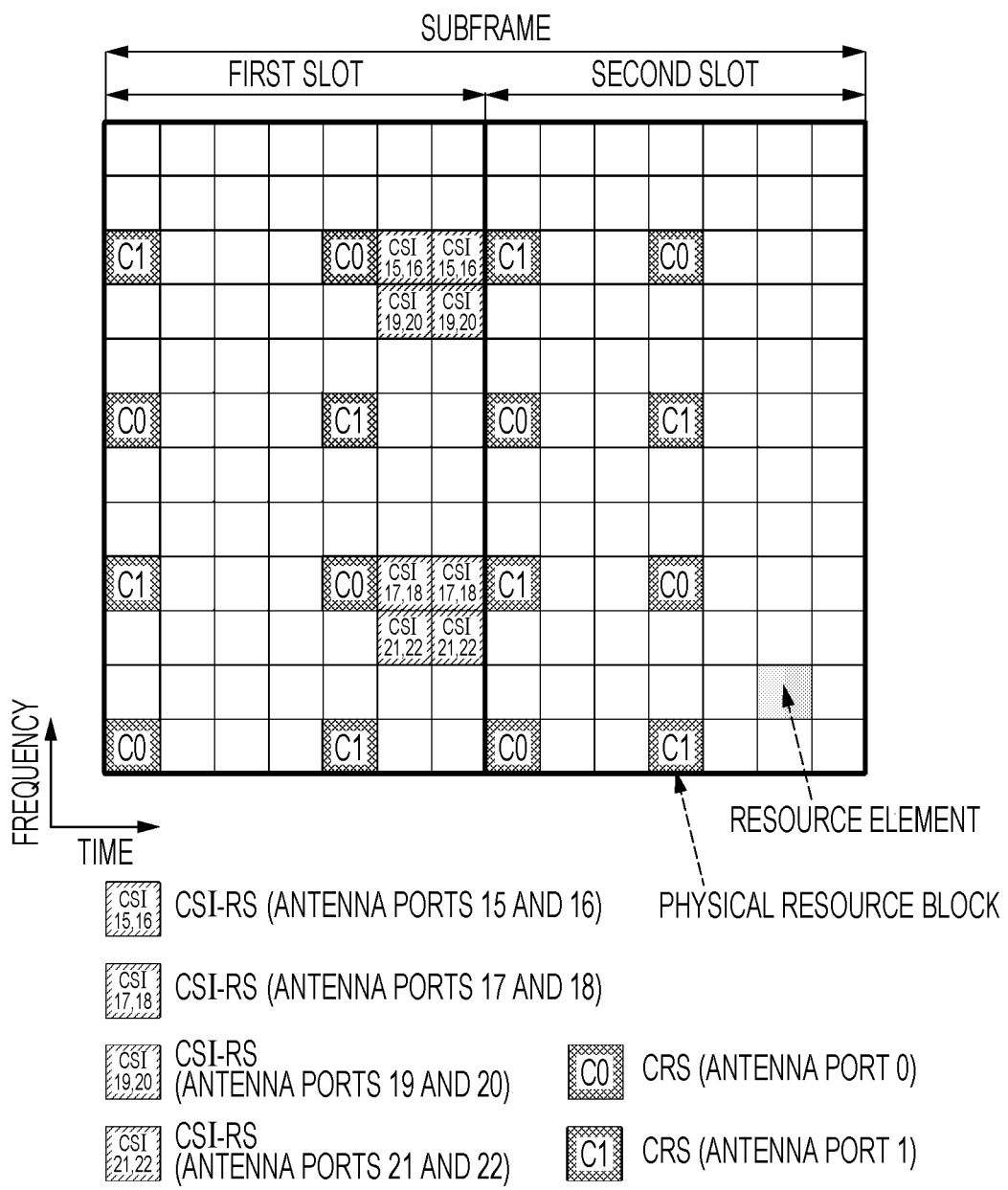
FIG. 4 is a diagram illustrating an example of the mapping of downlink reference signals of the present embodiment.

FIG. 4 is a diagram illustrating an example of the mapping of downlink reference signals of the present embodiment. In FIG. 4, the horizontal axis represents the time domain, and the vertical axis represents the frequency domain. In FIG. 4, only physical resource blocks with the same number in a given subframe are illustrated. In FIG. 4, rectangular areas surrounded by bold lines are physical resource blocks. Downlink reference signals include a cell-specific reference signal (CRS) and a CSI reference signal (CSI-RS). The base station device 3 transmits the CRS in all the downlink subframes within a cell. The base station device 3 transmits the CSI-RS in periodically configured downlink subframes within the cell.

In FIG. 4, rectangular areas with Ci are resource elements that are used for transmission of CRS for antenna port i (i=0, 1). In FIG. 4, rectangular areas with CSIx,y are resource elements that are used for transmission of CSI-RS for antenna port x and transmission of CSI-RS for antenna port y (x=15, 17, 19, 21; y=16, 18, 20, 22). In FIG. 4, the CSI-RS for antenna port x and the CSI-RS for antenna port y are code-multiplexed.

Resource elements that are used for transmission of CRS are determined on the basis of the physical-layer cell identity (PCI, Cell ID) of the cell. Resource elements that are used for transmission of CSI-RS within a physical resource block are configured by the base station device 3. The base station device 3 transmits information related to a CSI-RS configuration indicating a periodically configured downlink subframe, resource elements that are used for transmission of CSI-RS, and so forth to the mobile station device 1.

An example of the mapping of a physical downlink channel of the present embodiment will be described hereinafter.

Figure 5:
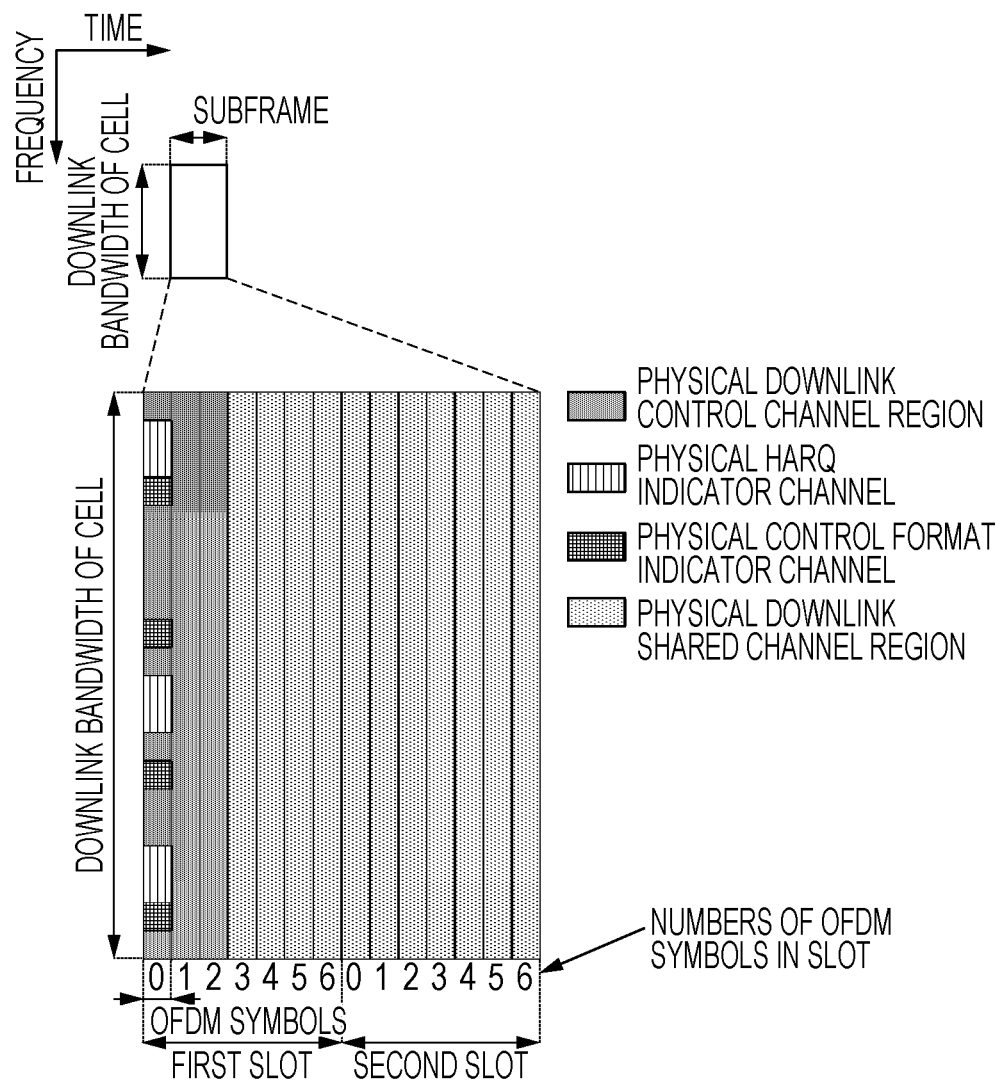
FIG. 5 is a diagram illustrating an example of the mapping of physical downlink channels in downlink component carriers of the present embodiment.

FIG. 5 is a diagram illustrating an example of the mapping of a physical downlink channel in a downlink component carrier of the present embodiment. In FIG. 5, the horizontal axis represents the time domain, and the vertical axis represents the frequency domain. The PCFICH is mapped onto the zeroth (initial) OFDM symbol in a subframe. The PCFICH is further mapped onto four resource element groups distributed in the frequency domain. The resource element groups are each composed of a plurality of contiguous resource elements. The PHICH is mapped onto the zeroth (initial) OFDM symbol in the subframe. One PCFICH is mapped onto three resource element groups distributed in the frequency domain. The base station device 3 can code-multiplex a plurality of PCFICHs on the same resource element.

The PDCCH is mapped onto the zeroth OFDM symbol, the zeroth and first OFDM symbols, or the zeroth through second OFDM symbols in the subframe. In the zeroth OFDM symbol, the PDCCH is mapped onto resource elements other than the resource elements onto which the PCFICH and the PHICH are mapped. The mobile station device 1 recognizes the OFDM symbol onto which the PDCCH is mapped, on the basis of the information received on the PCFICH. In addition, the base station device 3 can time-multiplex and frequency-multiplex a plurality of PDCCHs. The PDSCH is mapped onto the OFDM symbols onto which the PDCCH is not mapped in the subframe. The base station device 3 can frequency-multiplex, time multiplex, and/or spatially multiplex a plurality of PDSCHs.

A synchronization signal is transmitted in the zeroth and fifth subframes in each radio frame in the time domain. In the zeroth and fifth subframes, the synchronization signal is transmitted on the fifth and sixth OFDM symbols in the first slot. Furthermore, the synchronization signal is transmitted on center 72 subcarriers in the downlink of a cell in the frequency domain.

The PBCH is transmitted in the zeroth subframe in each radio frame in the time domain. In the zeroth subframe, the PBCH is transmitted on the zeroth to third OFDM symbols in the second slot. Furthermore, the PBCH is transmitted on center 72 subcarriers in the downlink of a cell in the frequency domain. The PMCH will not be described herein. The downlink reference signal, the synchronization signal, and the PBCH are not illustrated in FIG. 5.

A configuration of an uplink radio frame of the present embodiment will be described hereinafter.

Figure 6:
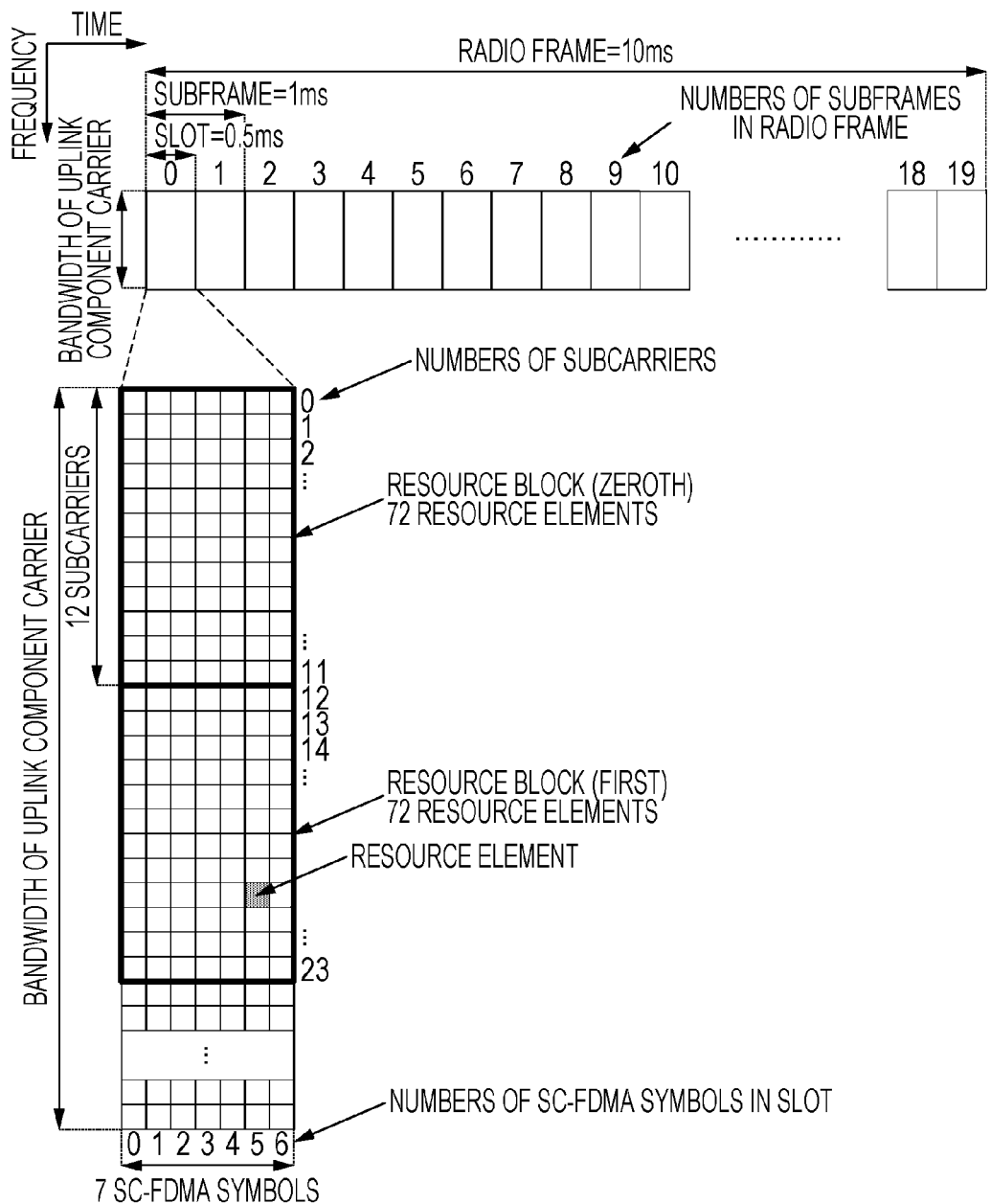
FIG. 6 is a diagram illustrating a schematic configuration of a radio frame on an uplink component carrier of the present embodiment.

FIG. 6 is a diagram illustrating a schematic configuration of a radio frame on an uplink component carrier of the present embodiment. In FIG. 6, the horizontal axis represents the time domain, and the vertical axis represents the frequency domain. Each radio frame is 10 ms long. In addition, each radio frame is composed of 20 slots. Each slot is 0.5 ms long. The slots in each radio frame are assigned numbers 0 to 19. Each subframe is 1 ms long. Each subframe is defined by two continuous slots. The i-th subframe in each radio frame is composed of the (2×i)-th slot and the (2×i+1)-th slot. That is, ten subframes can be utilized for each interval of 10 ms.

A signal or physical channel transmitted in each slot is expressed by a resource grid. The resource grid is defined by a plurality of subcarriers and a plurality of SC-FDMA symbols. The number of subcarriers forming each slot depends on the bandwidth of the uplink component carrier. The number of SC-FDMA symbols forming each slot is 7. Each of the elements in the resource grid is referred to as a resource element. A resource element is identified using a subcarrier number and an SC-FDMA symbol number.

A resource block is used to represent the mapping of resource elements on a given physical uplink channel (such as the PUSCH). Virtual resource blocks and physical resource blocks are defined as resource blocks. A given physical uplink channel is initially mapped onto virtual resource blocks. Then, the virtual resource blocks are mapped onto physical resource blocks. One physical resource block is defined by 7 continuous SC-FDMA symbols in the time domain and 12 contiguous subcarriers in the frequency domain. Thus, one physical resource block is composed of (7×12) resource elements. Furthermore, one physical resource block corresponds to one slot in the time domain, and corresponds to 180 kHz in the frequency domain. Physical resource blocks are assigned numbers, starting from 0, in the frequency domain.

An example of the mapping of a physical uplink channel of the present embodiment will be described hereinafter.

Figure 7:
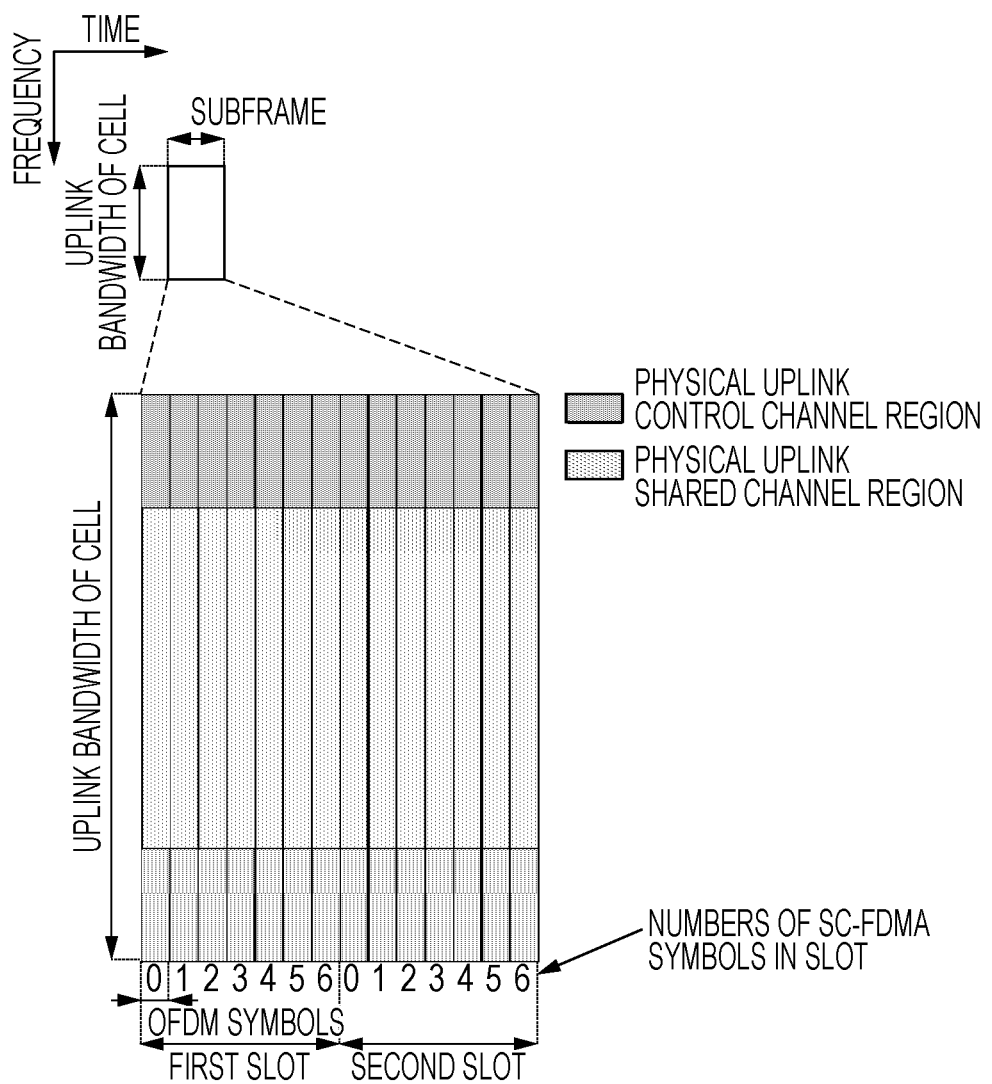
FIG. 7 is a diagram illustrating an example of the mapping of physical uplink channels in uplink component carriers of the present embodiment.

FIG. 7 is a diagram illustrating an example of the mapping of physical uplink channels in uplink component carriers of the present embodiment. In FIG. 7, the horizontal axis represents the time domain, and the vertical axis represents the frequency domain. The PUCCH is mapped onto a physical resource block on either side in a subframe. In addition, a single PUCCH is transmitted using physical resource blocks that are symmetric in the first slot and the second slot in the frequency domain. For example, the mobile station device 1 transmits a single PUCCH using the zeroth physical resource block in the first slot and the physical resource block with the largest number in the second slot.

Code multiplexing is applied to the PUCCH. A plurality of PUCCH formats 1, 1a, 1b, and 2 are code-multiplexed. A plurality of PUCCH formats 3 are code-multiplexed. PUCCH formats 1, 1a, 1b, and 2 are not code-multiplexed with PUCCH formats 3.

The PUCCH is mapped onto physical resource blocks onto which the PUCCH is not mapped in the subframe. A plurality of PUSCHs are frequency-multiplexed, time-multiplexed, and/or spatially multiplexed.

Periodic channel state information reports using the PUCCH of the present embodiment will be described hereinafter.

The base station device 3 configures, for the mobile station device 1, periodic channel state information reports on the PUCCH using any reporting mode. The base station device 3 configures, for each cell, a reporting mode and a PUCCH resource that are used for periodic channel state information reports. The base station device 3 transmits information related to periodic channel state information reports for each cell to the mobile station device 1.

(A) For example, reporting mode 1-0 is a reporting mode in which the PMI is not transmitted. Reporting mode 1-0 is also a reporting mode in which the sub-band CQI is not transmitted and the wideband CQI is transmitted.

(B) For example, reporting mode 1-1 is a reporting mode in which the PMI is transmitted. Reporting mode 1-1 is also a reporting mode in which the sub-band CQI and the wideband CQI are transmitted.

(C) For example, reporting mode 2-0 is a reporting mode in which the PMI is not transmitted. Reporting mode 2-0 is also a reporting mode in which the sub-band CQI is not transmitted and the wideband CQI is transmitted.

(D) For example, reporting mode 2-1 is a reporting mode in which the PMI is transmitted. Reporting mode 2-1 is also a reporting mode in which the sub-band CQI and the wideband CQI are transmitted.

The wideband CQI is computed based on the CRS and/or CSI-RS transmitted in all the physical resource blocks in a given subframe within a given cell. The sub-band CQI is computed based on the CRS and/or CSI-RS transmitted in a physical resource block forming a specific band that is part of a given subframe within a given cell.

Each of the reporting modes of channel state information supports a plurality of report types.

(A) For example, report type 1 supports sub-band CQI feedback.

(B) For example, report type 1a supports sub-band CQI and PMI feedback.

(C) For example, report type 2, report type 2a, and report type 2b support wideband CQI and PMI feedback.

(D) For example, report type 3 supports RI feedback.

(E) For example, report type 4 supports wideband CQI feedback.

(F) For example, report type 5 supports RI and wideband PMI feedback.

(G) For example, report type 6 supports RI and PTI feedback.

If reporting mode 1-0 is set for a given cell, the mobile station device 1 reports channel state information of report type 3 and report type 4 corresponding to the given cell to the base station device 3. If reporting mode 1-1 is set for a given cell, the mobile station device 1 reports channel state information of report type 2/2b/2c, report type 3, and report type 5 corresponding to the given cell to the base station device 3.

If reporting mode 2-0 is set for a given cell, the mobile station device 1 reports channel state information of report type 1, report type 3, and report type 4 corresponding to the given cell to the base station device 3. If reporting mode 2-1 is set for a given cell, the mobile station device 1 reports channel state information of report type 1/1a, report type 2/2a/2b, report type 3, and report type 6 corresponding to the given cell to the base station device 3.

A device configuration of the present embodiment will be described hereinafter.

Figure 8:
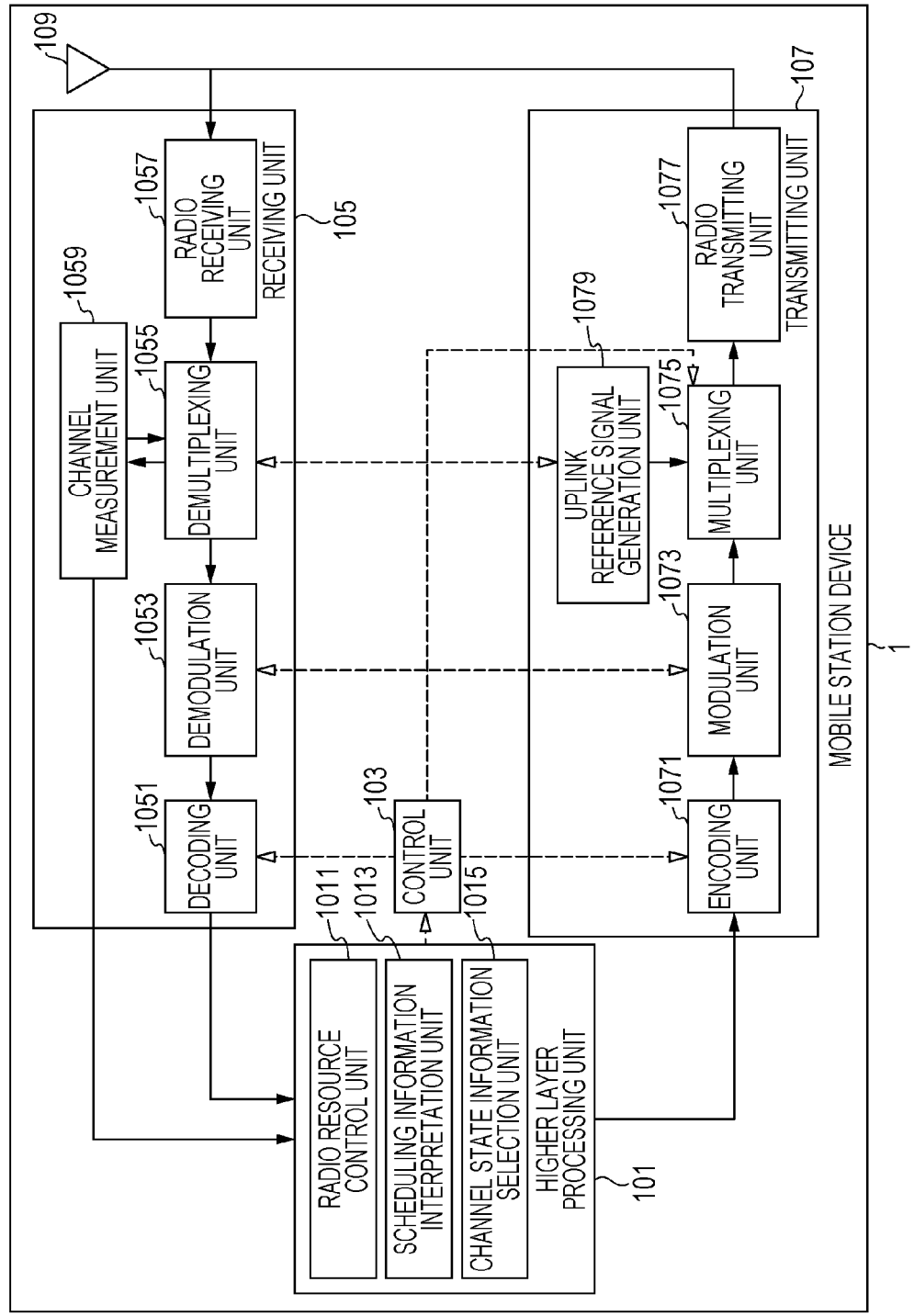
FIG. 8 is a schematic block diagram illustrating a configuration of a mobile station device 1 of the present embodiment.

FIG. 8 is a schematic block diagram illustrating a configuration of the mobile station device 1 of the present embodiment. As illustrated, the mobile station device 1 includes a higher layer processing unit 101, a control unit 103, a receiving unit 105, a transmitting unit 107, and a transmit/receive antenna 109. The higher layer processing unit 101 includes a radio resource control unit 1011, a scheduling information interpretation unit 1013, and a channel state information selection unit 1015. The receiving unit 105 includes a decoding unit 1051, a demodulation unit 1053, a demultiplexing unit 1055, a radio receiving unit 1057, and a channel measurement unit 1059. The transmitting unit 107 includes an encoding unit 1071, a modulation unit 1073, a multiplexing unit 1075, a radio transmitting unit 1077, and an uplink reference signal generation unit 1079.

The higher layer processing unit 101 outputs uplink data (transport block) generated in accordance with a user operation or the like to the transmitting unit 107. Further, the higher layer processing unit 101 performs the processing of the medium access control (MAC) layer, the packet data convergence protocol (PDCP) layer, the radio link control (RLC) layer, and the radio resource control (RRC) layer.

The radio resource control unit 1011 included in the higher layer processing unit 101 manages various types of configuration information on the mobile station device 1. For example, the radio resource control unit 1011 manages cells, and also manages periodic channel state information reports. Furthermore, the radio resource control unit 1011 generates information to be mapped onto each channel in the uplink, and outputs the information to the transmitting unit 107.

The scheduling information interpretation unit 1013 included in the higher layer processing unit 101 interprets information to be used for the scheduling of a physical channel (such as PUSCH or PDSCH) received through the receiving unit 105. The scheduling information interpretation unit 1013 generates control information to control the receiving unit 105 and the transmitting unit 107 in accordance with the result of the interpretation of the information, and outputs the control information to the control unit 103.

The channel state information selection unit 1015 included in the higher layer processing unit 101 selects which channel state information report to transmit in case of collision of a plurality of periodic channel state information reports. The channel state information selection unit 1015 also selects the resource on which the channel state information is transmitted. The channel state information selection unit 1015 generates control information to control the transmitting unit 107 to transmit the selected channel state information on the selected resource, and outputs the control information to the control unit 103. The detailed operation for the selection of channel state information and the selection of a resource will be described below.

The control unit 103 generates a control signal to control the receiving unit 105 and the transmitting unit 107 in accordance with the control information from the higher layer processing unit 101. The control unit 103 outputs the generated control signal to the receiving unit 105 and the transmitting unit 107 to control the receiving unit 105 and the transmitting unit 107.

The receiving unit 105 demultiplexes, demodulates, and decodes a received signal which has been received from the base station device 3 through the transmit/receive antenna 109 in accordance with the control signal input from the control unit 103, and outputs decoded information to the higher layer processing unit 101.

The radio receiving unit 1057 converts (down-converts) a downlink signal received through the transmit/receive antenna 109 into an intermediate-frequency signal, removes unnecessary frequency components, controls the amplification level so that the signal level can be appropriately maintained, orthogonally demodulates the received signal on the basis of its in-phase component and quadrature component, and converts the orthogonally demodulated analog signal into a digital signal. The radio receiving unit 1057 removes a portion corresponding to a guard interval (GI) from the converted digital signal, and performs a fast Fourier transform (FFT) on the signal from which the guard interval has been removed to extract a signal in the frequency domain.

The demultiplexing unit 1055 demultiplexes the extracted signal into a PHICH, PDCCH, PDSCH, and downlink reference signal. Furthermore, the demultiplexing unit 1055 performs channel compensation of the PHICH, PDCCH, and PDSCH using channel estimate values input from the channel measurement unit 1059. The demultiplexing unit 1055 outputs the demultiplexed downlink reference signal to the channel measurement unit 1059.

The demodulation unit 1053 multiplies the PHICH by the corresponding code to obtain a composite signal, demodulates the composite signal using the BPSK (Binary Phase Shift Keying) modulation scheme, and outputs the demodulated signal to the decoding unit 1051. The decoding unit 1051 decodes the PHICH addressed to the mobile station device 1, and outputs the decoded HARQ indicator to the higher layer processing unit 101. The demodulation unit 1053 demodulates the PDCCH using the QPSK modulation scheme, and outputs the result to the decoding unit 1051. The decoding unit 1051 attempts blind decoding for the PDCCH. If the blind decoding is successful, the decoding unit 1051 outputs the decoded downlink control information and RNTI included in the downlink control information to the higher layer processing unit 101.

The demodulation unit 1053 demodulates the PDSCH using the modulation scheme notified via a downlink assignment, such as QPSK (Quadrature Phase Shift Keying), 16QAM (Quadrature Amplitude Modulation), or 64QAM, and outputs the result to the decoding unit 1051. The decoding unit 1051 performs decoding based on the information related to coding rate, which has been notified via the downlink control information, and outputs decoded downlink data (transport block) to the higher layer processing unit 101.

The channel measurement unit 1059 measures the downlink path loss using the downlink reference signal input from the demultiplexing unit 1055, and outputs the measured path loss to the higher layer processing unit 101. Furthermore, the channel measurement unit 1059 calculates channel state information using the downlink reference signal input from the demultiplexing unit 1055, and outputs the calculated channel state information to the higher layer processing unit 101. The channel measurement unit 1059 further calculates a channel estimate value for the downlink using the downlink reference signal, and outputs the channel estimate value to the demultiplexing unit 1055.

The transmitting unit 107 generates an uplink reference signal in accordance with the control signal input from the control unit 103, encodes and modulates the uplink data (transport block) input from the higher layer processing unit 101, multiplexes the PUCCH, the PUSCH, and the generated uplink reference signal, and transmits the result to the base station device 3 through the transmit/receive antenna 109.

The encoding unit 1071 encodes the uplink control information input from the higher layer processing unit 101 using convolutional coding, block coding, or the like. The encoding unit 1071 further performs turbo coding based on information to be used for the scheduling of the PUSCH.

The modulation unit 1073 modulates the coded bits input from the encoding unit 1071 using the modulation scheme notified via the downlink control information, such as BPSK, QPSK, 16QAM, or 64QAM, or using a modulation scheme determined in advance for each channel. The modulation unit 1073 determines the number of data sequences to be spatially multiplexed, in accordance with the information to be used for the scheduling of the PUSCH, maps a plurality of pieces of uplink data to be transmitted on the same PUSCH by using MIMO SM onto a plurality of sequences, and precodes the sequences.

The uplink reference signal generation unit 1079 generates a sequence that is determined in accordance with a predetermined rule, in accordance with the physical-layer cell identity (referred to as physical cell identity: PCI, Cell ID, or the like) for identifying the base station device 3, the bandwidth to which the uplink reference signal is mapped, the cyclic shift notified via the uplink grant, parameter values for the generation of a DMRS sequence, and so forth. The multiplexing unit 1075 rearranges the modulation symbols for the PUSCH in accordance with the control signal input from the control unit 103 into parallel modulation symbols, and then performs a discrete Fourier transform (DFT). Furthermore, the multiplexing unit 1075 multiplexes the signals for the PUCCH and the PUSCH with the generated uplink reference signal for each transmit antenna port. That is, the multiplexing unit 1075 maps the signals for the PUCCH and the PUSCH and the generated uplink reference signal onto resource elements for each transmit antenna port.

The radio transmitting unit 1077 performs an inverse fast Fourier transform (IFFT) on the multiplexed signal to perform SC-FDMA modulation, adds a guard interval to the SC-FDMA modulated SC-FDMA symbols, generates a baseband digital signal, converts the baseband digital signal into an analog signal, generates an intermediate-frequency in-phase component and quadrature component from the analog signal, removes the extra frequency components for the intermediate frequency band, converts (up-converts) the intermediate-frequency signal into a high-frequency signal, removes the extra frequency components, performs power amplification, and outputs the result to the transmit/receive antenna 109 for transmission.

Figure 9:
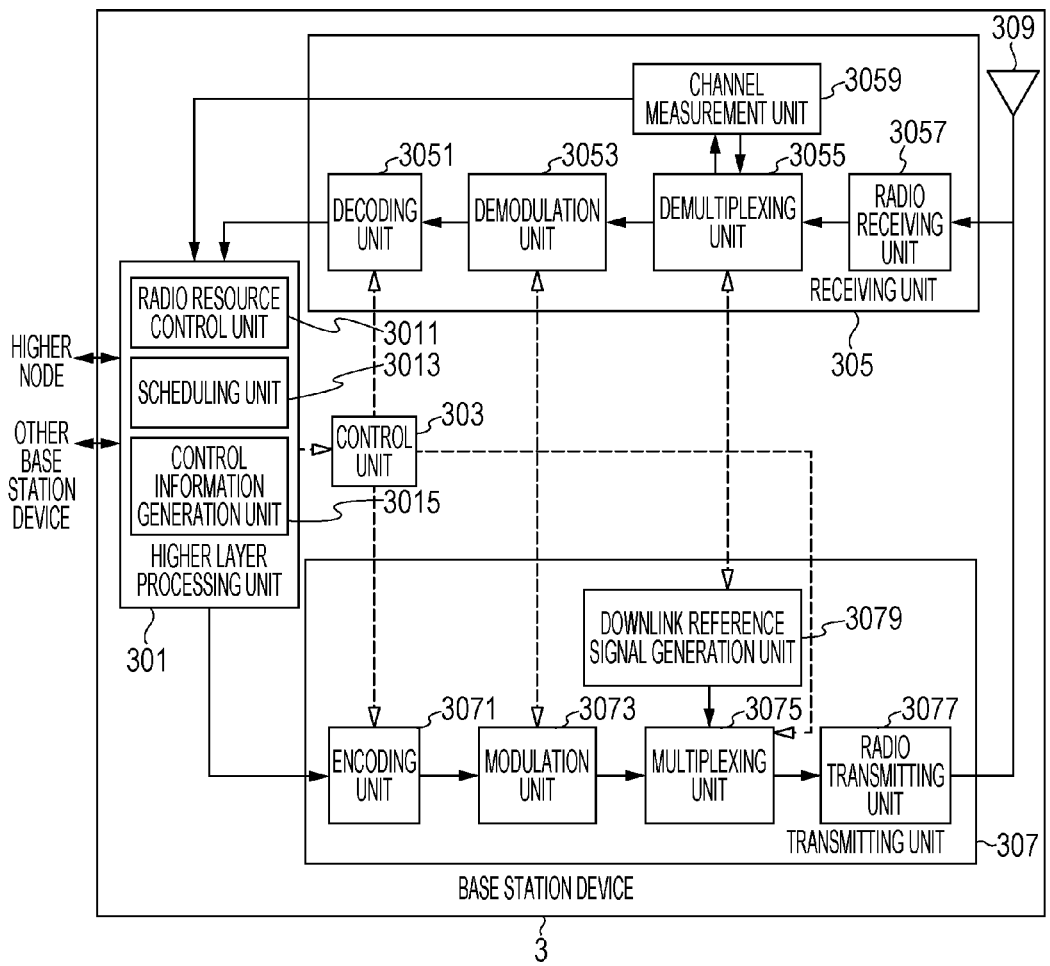
FIG. 9 is a schematic block diagram illustrating a configuration of a base station device 3 of the present embodiment.

FIG. 9 is a schematic block diagram illustrating a configuration of the base station device 3 of the present embodiment. As illustrated, the base station device 3 includes a higher layer processing unit 301, a control unit 303, a receiving unit 305, a transmitting unit 307, and a transmit/receive antenna 309. The higher layer processing unit 301 includes a radio resource control unit 3011, a scheduling unit 3013, and a control information generation unit 3015. The receiving unit 305 includes a decoding unit 3051, a demodulation unit 3053, a demultiplexing unit 3055, a radio receiving unit 3057, and a channel measurement unit 3059. The transmitting unit 307 includes an encoding unit 3071, a modulation unit 3073, a multiplexing unit 3075, a radio transmitting unit 3077, and a downlink reference signal generation unit 3079.

The higher layer processing unit 301 performs the processing of the medium access control (MAC) layer, the packet data convergence protocol (PDCP) layer, the radio link control (RLC) layer, and the radio resource control (RRC) layer. Furthermore, the higher layer processing unit 301 generates control information to control the receiving unit 305 and the transmitting unit 307, and outputs the control information to the control unit 303.

The radio resource control unit 3011 included in the higher layer processing unit 301 generates downlink data (transport block), an RRC signal, and a MAC CE (Control Element), which are mapped onto the PDSCH for the downlink, or acquires them from the higher node, and outputs them to the transmitting unit 307. Furthermore, the radio resource control unit 3011 manages various types of configuration information on each of the mobile station devices 1. For example, the radio resource control unit 3011 manages cells, manages periodic channel state information reports, and performs other processing.

The scheduling unit 3013 included in the higher layer processing unit 301 determines frequencies and subframes to which physical channels (PDSCH and PUSCH) are assigned, coding rate and modulation scheme for the physical channels (the PDSCH and the PUSCH), transmit power, and so forth using the channel estimate value, channel state information, and the like input from the channel measurement unit 3059. The scheduling unit 3013 generates control information to control the receiving unit 305 and the transmitting unit 307 in accordance with the result of scheduling, and outputs the control information to the control unit 303. The scheduling unit 3013 further outputs the result of the scheduling of the physical channels (the PDSCH and the PUSCH) to the control information generation unit 3015.

The control information generation unit 3015 generates information to be used for the scheduling of the physical channels (the PDSCH and the PUSCH), in accordance with the result of scheduling input from the scheduling unit 3013. The control information generation unit 3015 outputs the generated information to the transmitting unit 307.

The control unit 303 generates a control signal to control the receiving unit 305 and the transmitting unit 307 in accordance with the control information from the higher layer processing unit 301. The control unit 303 outputs the generated control signal to the receiving unit 305 and the transmitting unit 307 to control the receiving unit 305 and the transmitting unit 307.

The receiving unit 305 demultiplexes, demodulates, and decodes the received signal which has been received from the mobile station device 1 through the transmit/receive antenna 309 in accordance with the control signal input from the control unit 303, and outputs the decoded information to the higher layer processing unit 301. The radio receiving unit 3057 converts (down-converts) an uplink signal received through the transmit/receive antenna 309 into an intermediate-frequency signal, removes unnecessary frequency components, controls the amplification level so that the signal level can be appropriately maintained, orthogonally demodulates the received signal on the basis of its in-phase component and quadrature component, and converts the orthogonally demodulated analog signal into a digital signal.

The radio receiving unit 3057 removes a portion corresponding to a guard interval (GI) from the converted digital signal. The radio receiving unit 3057 performs a fast Fourier transform (FFT) on the signal from which the guard interval has been removed to extract a signal in the frequency domain, and outputs the extracted signal to the demultiplexing unit 3055.

The demultiplexing unit 1055 demultiplexes the signal input from the radio receiving unit 3057 into signals such as a PUCCH, PUSCH, and uplink reference signal. This demultiplexing operation is based on radio resource allocation information included in an uplink grant determined in advance by the base station device 3 using the radio resource control unit 3011 and reported to each mobile station device 1. Furthermore, the demultiplexing unit 3055 performs channel compensation of the PUCCH and PUSCH using channel estimate values input from the channel measurement unit 3059. The demultiplexing unit 3055 outputs the demultiplexed uplink reference signal to the channel measurement unit 3059.

The demodulation unit 3053 performs an inverse discrete Fourier transform (IDFT) on the PUSCH to acquire modulation symbols, and demodulates the received signal using a modulation scheme determined in advance for each of the modulation symbols for the PUCCH and the PUSCH, such as BPSK (Binary Phase Shift Keying), QPSK, 16QAM, or 64QAM, or using the modulation scheme of which the base station device 3 notifies each of the mobile station devices 1 in advance via an uplink grant. The demodulation unit 3053 separates the modulation symbols of the plurality of pieces of uplink data transmitted on the same PUSCH by using MIMO SM in accordance with the number of sequences to be spatially multiplexed, of which each of the mobile station devices 1 is notified in advance via an uplink grant, and information on precoding to be instructed to be performed on the sequence or sequences.

The decoding unit 3051 decodes the coded bits for the PUCCH and the PUSCH, which have been demodulated, using a predetermined coding scheme at a predetermined coding rate or at a coding rate of which the base station device 3 notifies the mobile station device 1 in advance via an uplink grant, and outputs decoded uplink data and uplink control information to the higher layer processing unit 101. If the PUSCH is to be retransmitted, the decoding unit 3051 performs decoding using the coded bits input from the higher layer processing unit 301 and held in a HARQ buffer and using the demodulated coded bits. The channel measurement unit 309 measures a channel estimate value, channel quality, and so forth using the uplink reference signal input from the demultiplexing unit 3055, and outputs the results to the demultiplexing unit 3055 and the higher layer processing unit 301.

The transmitting unit 307 generates a downlink reference signal in accordance with the control signal input from the control unit 303, encodes and modulates the HARQ indicator, downlink control information, and downlink data input from the higher layer processing unit 301, multiplexes the PHICH, PDCCH, PDSCH, and downlink reference signal, and transmits a signal to the mobile station device 1 through the transmit/receive antenna 309.

The encoding unit 3071 encodes the HARQ indicator, downlink control information, and downlink data input from the higher layer processing unit 301 using a predetermined coding scheme, such as block coding, convolutional coding, or turbo coding, or using a coding scheme determined by the radio resource control unit 3011. The modulation unit 3073 modulates the coded bits input from the encoding unit 3071 using a predetermined modulation scheme, such as BPSK, QPSK, 16QAM, or 64QAM, or using a modulation scheme determined by the radio resource control unit 3011.

The downlink reference signal generation unit 3079 generates, as a downlink reference signal, a sequence known to the mobile station device 1, which is determined in accordance with a predetermined rule on the basis of a physical-layer cell identity (PCI) for identifying the base station device 3 and the like. The multiplexing unit 3075 multiplexes the modulated modulation symbols for each channel and the generated downlink reference signal. That is, the multiplexing unit 3075 maps the modulated modulation symbols for each channel and the generated downlink reference signal onto resource elements.

The radio transmitting unit 3077 performs an inverse fast Fourier transform (IFFT) on the multiplexed modulation symbols and so forth to perform OFDM modulation, adds a guard interval to the OFDM modulated OFDM symbols, generates a baseband digital signal, converts the baseband digital signal into an analog signal, generates an intermediate-frequency in-phase component and quadrature component from the analog signal, removes the extra frequency components for the intermediate frequency band, converts (up-converts) the intermediate-frequency signal into a high-frequency signal, removes the extra frequency components, performs power amplification, and outputs the result to the transmit/receive antenna 309 for transmission.

The detailed configuration of PUCCH format 2 of the present embodiment will be described hereinafter.

Figure 10:
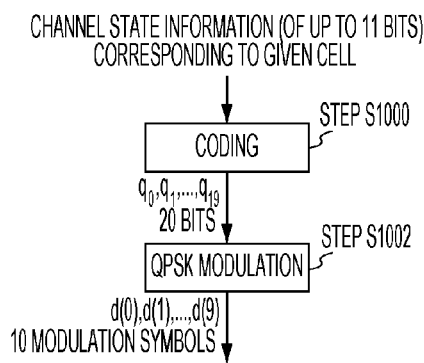
FIG. 10 is a diagram illustrating an example of the encoding and modulation of channel state information that is transmitted using PUCCH format 2 of the present embodiment.

FIG. 10 is a diagram illustrating an example of the encoding and modulation of channel state information that is transmitted using PUCCH format 2 of the present embodiment. In FIG. 10, the mobile station device 1 encodes channel state information $o_i$ of up to 11 bits corresponding to a given single cell in accordance with Expression (1) to obtain a coded bit sequence $q_i$ of 20 bits (i=0, 1, . . . , 19) (step S1000). In FIG. 10, the mobile station device 1 performs QPSK modulation on the coded bit sequence $q_i$ to obtain ten modulation symbols d(i) (i=0, 1, . . . , 9) (step S1002).

$$q_i = \Sigma_{n=0}^{O-1}(o_n \cdot M_{i,n}) \bmod 2 (i=0,1,\ldots,19) \quad [\text{Math. 1}]$$

Figures 11, 12:
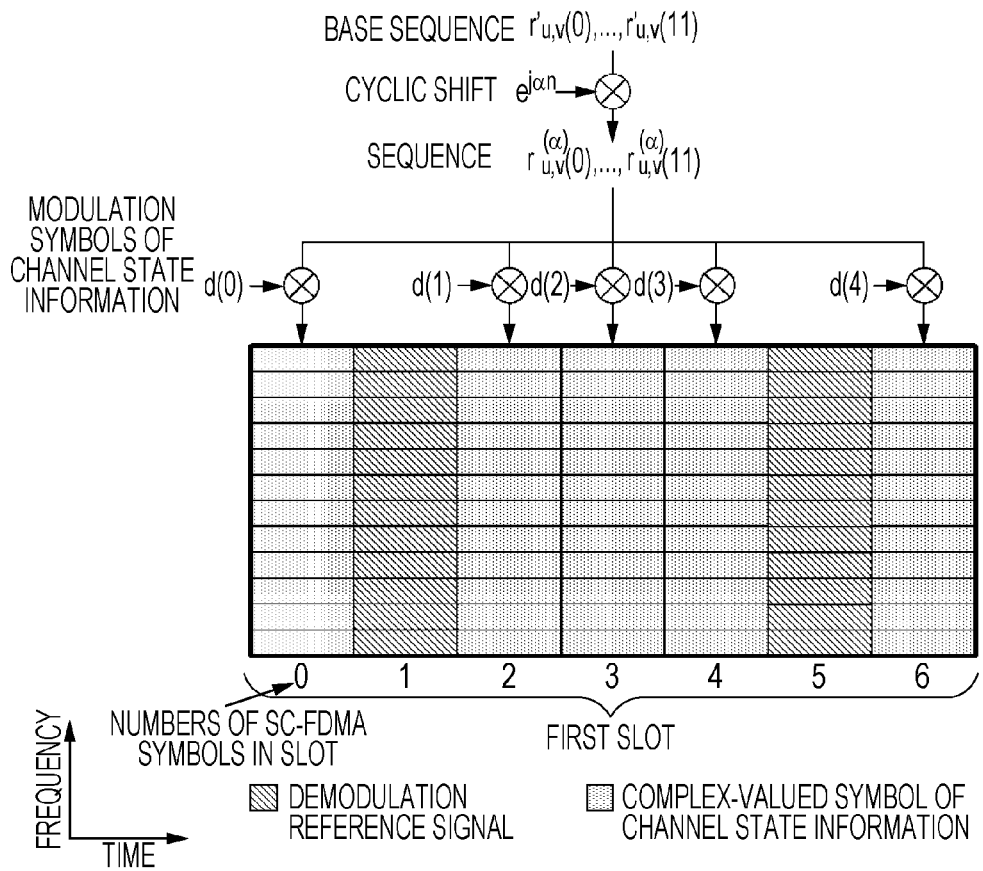
FIG. 11 is a diagram illustrating an example of sequences $M_{i,n}$ used for the encoding of channel state information that is transmitted on PUCCH format 2 of the present embodiment.
FIG. 12 is a diagram illustrating an example of a configuration of a first slot in PUCCH format 2 of the present embodiment.

In Expression (1), O denotes the number of bits of channel state information that is transmitted using PUCCH format 2. In Expression (1), [X] mod [Y] denotes a function to determine the remainder of [X] divided by [Y]. FIG. 11 is a diagram illustrating an example of sequences $M_{i,n}$ used for the encoding of channel state information that is transmitted on PUCCH format 2 of the present embodiment.

Figure 13:
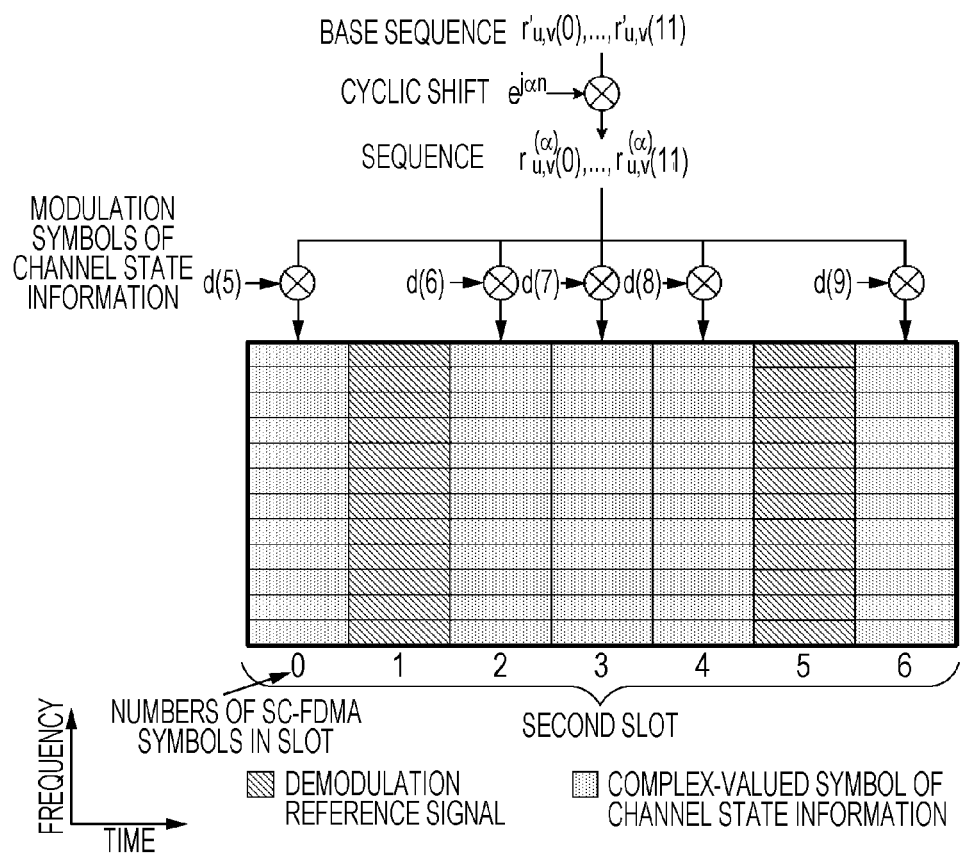
FIG. 13 is a diagram illustrating an example of a configuration of a second slot in PUCCH format 2 of the present embodiment.

FIG. 12 is a diagram illustrating an example of a configuration of a first slot in PUCCH format 2 of the present embodiment. FIG. 13 is a diagram illustrating an example of a configuration of a second slot in PUCCH format 2 of the present embodiment. In FIG. 12 and FIG. 13, the horizontal axis represents the time domain, and the vertical axis represents the frequency domain. The mobile station device 1 transmits the modulation symbols d(0) to d(4) using one physical resource block in the first slot. The mobile station device 1 transmits the modulation symbols d(5) to d(9) using one physical resource block in the second slot.

In FIG. 12 and FIG. 13, complex-valued symbols that are generated by the multiplication of the modulation symbols of the channel state information by an orthogonal sequence $r^{(\alpha)}_{u,v}(i)$ (i=0, 1, . . . , 11) are mapped onto resource elements. In FIG. 12 and FIG. 13, the complex-valued symbols corresponding to the channel state information are mapped onto the resource elements of the zeroth, second, third, fourth, and sixth SC-FDMA symbols in the first slot and the second slot. Note that uplink reference signals are mapped onto the resource elements of the first and fifth SC-FDMA symbols in the first slot and the second slot.

Figures 14, 15:
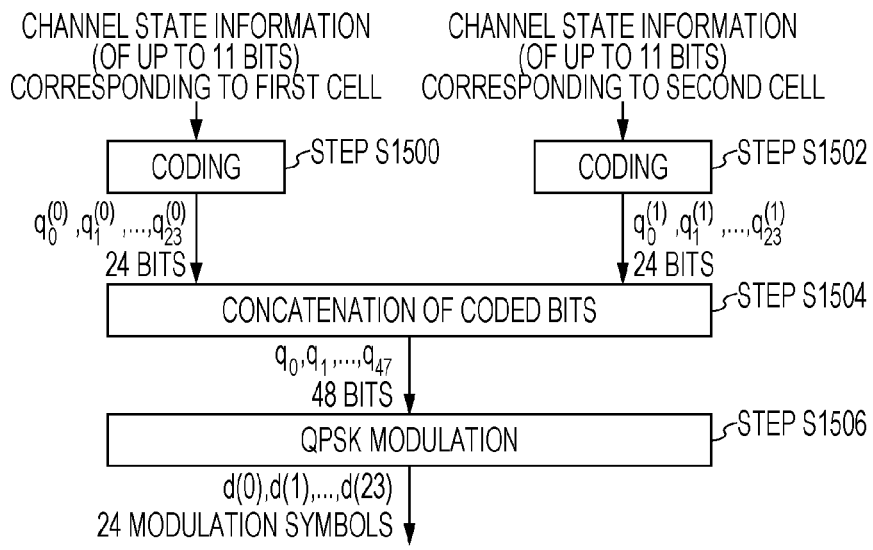
FIG. 14 is a diagram illustrating an example of a base sequence of the present embodiment.
FIG. 15 is a diagram illustrating an example of the encoding and modulation of channel state information that is transmitted using PUCCH format 3 of the present embodiment.

In FIG. 12 and FIG. 13, the orthogonal sequence $r^{(\alpha)}_{u,v}(i)$ is generated by the multiplication of a base sequence $r'_{u,v}(i)$ (i=0, 1, . . . , 11) by a cyclic shift FIG. 14 is a diagram illustrating an example of a base sequence of the present embodiment. The base sequence number v of the base sequence used for transmission of PUCCH is always 0. The sequence group number u of the base sequence is calculated using a pseudo random sequence and/or a sequence-shift pattern. The initial value of the pseudo random sequence and the value of the sequence-shift pattern are calculated using the physical-layer cell identity. The parameter α of the cyclic shift is calculated using the information transmitted from the base station device 3 to the mobile station device 1 and using the pseudo random sequence.

The detailed configuration of PUCCH format 3 of the present embodiment will be described hereinafter.

FIG. 15 is a diagram illustrating an example of the encoding and modulation of channel state information that is transmitted using PUCCH format 3 of the present embodiment. FIG. 15 illustrates an example in which the mobile station device 1 transmits the channel state information corresponding to the first cell and the channel state information corresponding to the second cell using PUCCH format 3. Note that the mobile station device 1 may transmit channel state information corresponding to a given single cell using PUCCH format 3. Note that the mobile station device 1 may transmit a set of three or more channel state information respectively corresponding to three or more cells using PUCCH format 3.

In FIG. 15, the mobile station device 1 encodes channel state information $o^{(0)}_i$ of up to 11 bits corresponding to the first cell in accordance with Expression (2) to obtain a coded bit sequence $q^{(0)}_i$ of 24 bits (i=0, 1, . . . , 23) (step S1500). In FIG. 15, the mobile station device 1 encodes channel state information $o^{(1)}_i$ of up to 11 bits corresponding to the second cell in accordance with Expression (2) to obtain a coded bit sequence $q^{(1)}_i$ of 24 bits (i=0, 1, . . . , 23) (step S1500). In Expression (2), $O^{(x)}$ denotes the number of bits of channel state information corresponding to the x-th cell. FIG. 16 is a diagram illustrating an example of sequences $M_{i,n}$ used for the encoding of channel state information that is transmitted on PUCCH format 3 of the present embodiment.

$$q_i^{(x)} = \Sigma_{n=0}^{O^{(x)}-1}(o_n^{(x)} \cdot M_{i,n}) \bmod 2 (i=0,1,\ldots,23) \quad \text{[Math. 2]}$$

In FIG. 15, the mobile station device 1 concatenates the coded bit $q^{(0)}_i$ of the channel state information corresponding to the first cell and the coded bit $q^{(1)}_i$ of the channel state information corresponding to the second cell, and generates a coded bit sequence $q_i$ of 48 bits (step S1504). In FIG. 15, the mobile station device 1 performs QPSK modulation on the coded bit sequence $q_i$ to obtain 24 modulation symbols d(i) (i=0, 1, . . . , 23) (step S1506).

Figure 17:
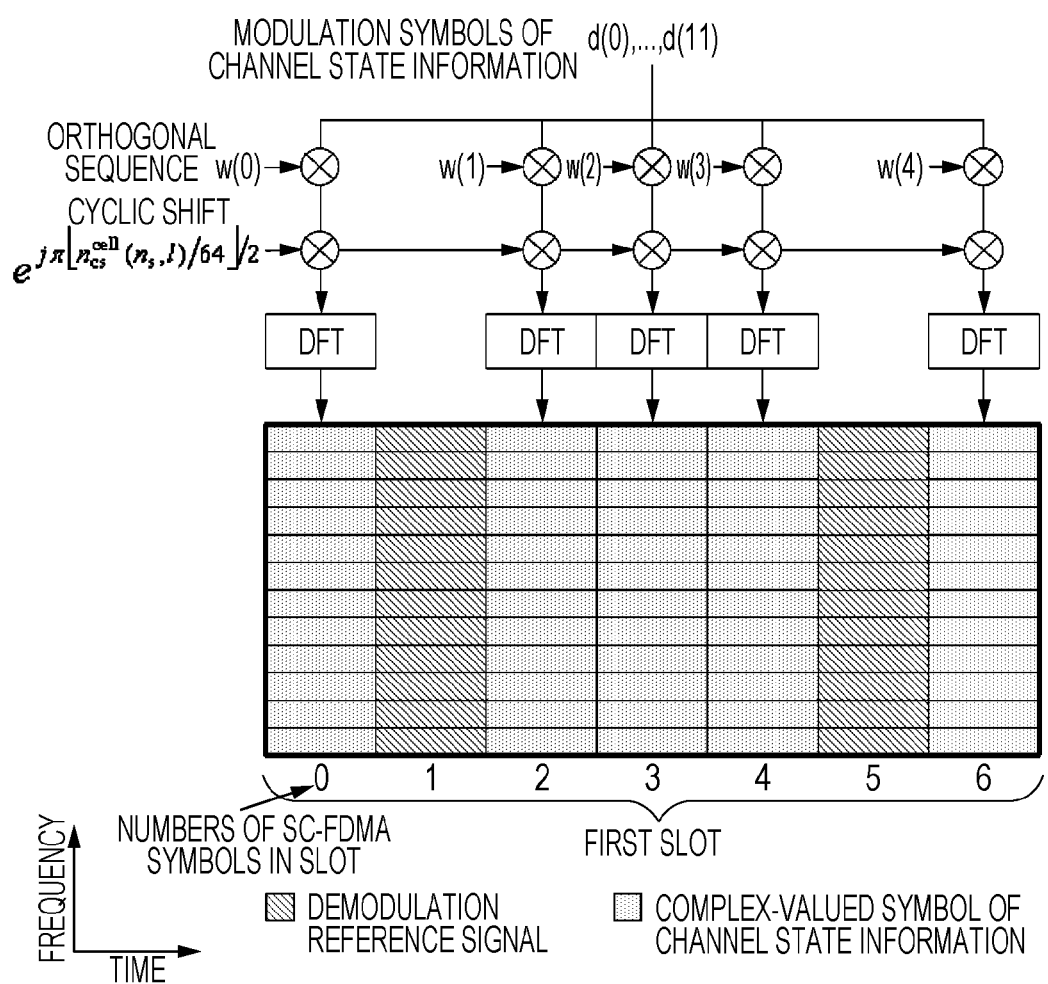
FIG. 17 is a diagram illustrating an example of a configuration of a first slot in PUCCH format 3 of the present embodiment.
Figure 18:
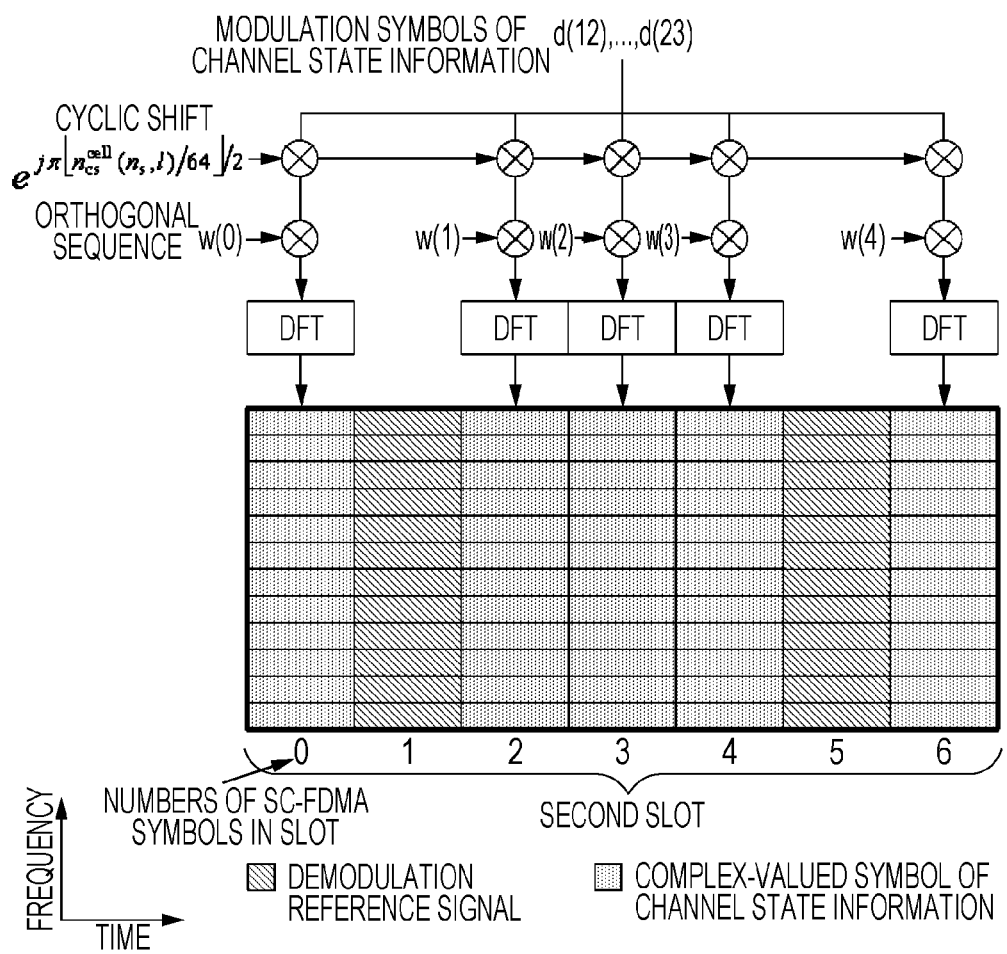
FIG. 18 is a diagram illustrating an example of a configuration of a second slot in PUCCH format 3 of the present embodiment.

FIG. 17 is a diagram illustrating an example of a configuration of a first slot in PUCCH format 3 of the present embodiment. FIG. 18 is a diagram illustrating an example of a configuration of a second slot in PUCCH format 3 of the present embodiment. In FIG. 17 and FIG. 18, the horizontal axis represents the time domain, and the vertical axis represents the frequency domain. The mobile station device 1 transmits the modulation symbols d(0) to d(11) using one physical resource block in the first slot. The mobile station device 1 transmits the modulation symbols d(12) to d(23) using one physical resource block in the second slot.

In FIG. 17 and FIG. 18, the mobile station device 1 spreads the modulation symbols of the channel state information using the orthogonal sequence w(i). Furthermore, the mobile station device 1 multiplies the spread modulation symbols of the channel state information by a cyclic shift. The value of the cyclic shift is calculated using a pseudo random sequence. In addition, the pseudo random sequence is re-computed for each SC-FDMA symbol.

The mobile station device 1 performs discrete Fourier transform (DFT) processing on the symbols multiplied by the cyclic shift. The mobile station device 1 maps complex-valued symbols, which are the output of the DFT processing, onto resource elements. In FIG. 17 and FIG. 18, the complex-valued symbols corresponding to the channel state information are mapped onto the resource elements of the zeroth, second, third, fourth, and sixth SC-FDMA symbols in the first slot and the second slot. Note that uplink reference signals are mapped onto the resource elements of the first and fifth SC-FDMA symbols in the first slot and the second slot.

A first embodiment of the present embodiment will be described in detail hereinafter with reference to the drawings.

The base station device 3 of the first embodiment configures the mobile station device 1 with a resource for PUCCH format 2 (first format) that is usable for one report of channel state information, for each of a plurality of cells. The base station device 3 of the first embodiment configures, for the mobile station device 1, periodic reports of channel state information using a resource for PUCCH format 2 (first format) for each of the plurality of cells. Furthermore, the base station device 3 of the first embodiment configures the mobile station device 1 with one resource for PUCCH format 3 (second format) that is usable for a plurality of reports of channel state information. The base station device 3 of the first embodiment transmits downlink control information that is used for the scheduling of the PUSCH to the mobile station device 1. The base station device 3 of the first embodiment further transmits information indicating whether or not simultaneous transmission of PUSCH and PUCCH has been configured to the mobile station device 1. For example, the base station device 3 configures the mobile station device 1 with a resource for PUCCH format 2 using a higher-layer signal (radio resource control information dedicated to the mobile station device 1). Furthermore, for example, the base station device 3 configures the mobile station device 1 with a resource for PUCCH format 3 using a higher-layer signal (radio resource control information dedicated to the mobile station device 1). That is, for example, the base station device 3 configures the mobile station device 1 with a resource for PUCCH format 2 for each of a plurality of cells, and with one resource for PUCCH format 3 using a higher-layer signal (radio resource control information dedicated to the mobile station device 1).

The base station device 3 of the first embodiment sets information indicating whether or not simultaneous transmission of PUSCH and PUCCH has been configured to TRUE or FALSE. TRUE indicates that simultaneous transmission of PUSCH and PUCCH is allowed. FALSE indicates that simultaneous transmission of PUSCH and PUCCH is not allowed. The mobile station device 1 of the first embodiment applies the configuration of simultaneous transmission of PUSCH and PUCCH in accordance with the information indicating whether or not simultaneous transmission of PUSCH and PUCCH has been configured.

If a PUSCH is not transmitted and a channel state information report using PUCCH format 2 has not collided with another channel state information report in a given subframe, the mobile station device 1 of the first embodiment for which simultaneous transmission of PUSCH and PUCCH has not been configured transmits the channel state information report that has not collided to the base station device 3 using the resources for PUCCH format 2.

If a PUSCH is not transmitted and the plurality of channel state information reports using PUCCH format 2 have collided in a given subframe, the mobile station device 1 for which simultaneous transmission of PUSCH and PUCCH has not been configured according to the first embodiment transmits some or all of the plurality of channel state information reports that have collided to the base station device 3 using the resource for PUCCH format 3.

If at least one PUSCH is transmitted and at least one channel state information report using PUCCH format 2 is present in a given subframe, the mobile station device 1 for which simultaneous transmission of PUSCH and PUCCH has not been configured according to the first embodiment transmits part or whole of the at least one channel state information report to the base station device 3 using one PUSCH resource in the at least one PUSCH.

If a channel state information report using PUCCH format 2 has not collided with another channel state information report in a given subframe, the mobile station device 1 of the first embodiment for which simultaneous transmission of PUSCH and PUCCH has been configured transmits the channel state information report that has not collided to the base station device 3 using a resource for PUCCH format 2.

If the plurality of channel state information reports using PUCCH format 2 have collided in a given subframe, the mobile station device 1 of the first embodiment for which simultaneous transmission of PUSCH and PUCCH has been configured transmits some or all of the plurality of channel state information reports that have collided to the base station device 3 using the resource for PUCCH format 3.

FIG. 19 is a diagram illustrating an example of configured periodic channel state information for cells 0 through 3 of the present embodiment. In FIG. 19, the resource for PUCCH format 2, the reporting mode of channel state information, the offset of wideband/sub-band CQI, the period of wideband CQI, the period of sub-band CQI (only reporting mode 2-0 and mode 2-1), the offset of RI and the period of RI are configured for each of cells 0 through 3. In FIG. 19, resources 1 through 4 are resources of the primary cell (uplink primary component carrier). In FIG. 19, furthermore, some or all of resources 1 through 4 may be the same resource. Alternatively, in FIG. 19, resources 1 through 4 may be different resources.

FIG. 20 is a diagram illustrating the timing of channel state information reports in accordance with the configuration illustrated in FIG. 19 according to the present embodiment. In FIG. 20, the horizontal axis represents the time domain. The base station device 3 independently configures periodic channel state information reports for each cell. Thus, collisions of a plurality of pieces of channel state information corresponding to a plurality of cells may possibly occur. In addition, the offset/period of CQI and the offset/period of RI are separately configured for a given cell, resulting in a possibility that collisions of channel state information of different report types corresponding to the same cell will occur. For example, in FIG. 20, channel state information reporting on cell 3 and channel state information reporting on cell 4 collide in the eighth subframe. In addition, for example, in FIG. 20, channel state information of report type 3 corresponding to cell 4 and channel state information of report type 4 corresponding to the same cell, or cell 4, collide in the eighth subframe.

FIG. 21 is a diagram illustrating a first example of the correspondences between channel state information reports and physical uplink control channel resources of the present embodiment. If a PUSCH is not transmitted and only a channel state information report of report type 1 corresponding to cell 0 is present in a given subframe, the mobile station device 1 for which simultaneous transmission of PUSCH and PUCCH has not been configured transmits channel state information using resource 1 of PUCCH format 2 corresponding to cell 0.

If a PUSCH is not transmitted and a channel state information report of a given report type (first report type) corresponding to a given cell and a channel state information report of a report type (second report type) different from the given report type corresponding to the given cell have collided in a given subframe, the mobile station device 1 for which simultaneous transmission of PUSCH and PUCCH has not been configured drops either the channel state information report of the first report type or the channel state information report of the second report type in accordance with the priorities of the report types. The report type (3, 5, or 6) has higher priority than the report type (1, 1a, 2, 2a, 2b, 2c, or 4). That is, if a PUSCH is not transmitted and a channel state information report of a given report type (3, 5 or 6) corresponding to a given cell and a channel state information report of a report type (1, 1a, 2, 2a, 2b, 2c, or 4) corresponding to the given cell have collided in a given subframe, the mobile station device 1 for which simultaneous transmission of PUSCH and PUCCH has not been configured drops the channel state information report of the report type (1, 1a, 2, 2a, 2b, 2c, or 4).

Figure 22:
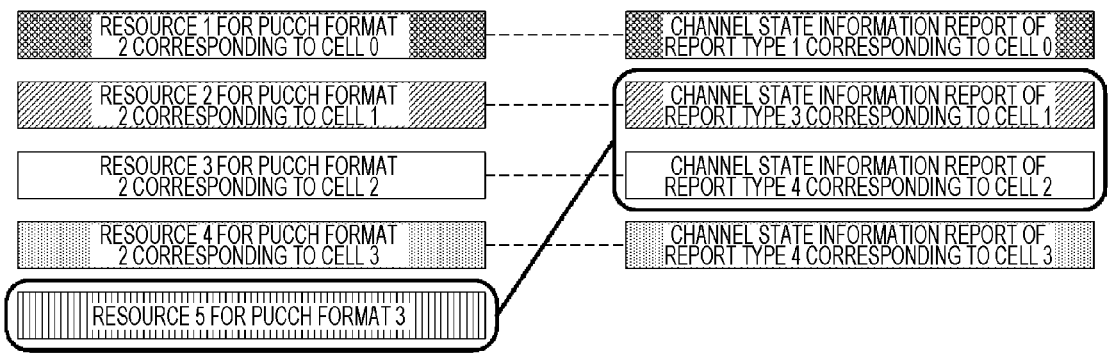
FIG. 22 is a diagram illustrating a second example of the correspondences between channel state information reports and physical uplink control channel resources of the present embodiment.

FIG. 22 is a diagram illustrating a second example of the correspondences between channel state information reports and physical uplink control channel resources of the present embodiment. In FIG. 22, a PUSCH is not transmitted and a channel state information report of report type 1 corresponding to cell 0, a channel state information report of report type 3 corresponding to cell 1, a channel state information report of report type 4 corresponding to cell 2 and a channel state information report of report type 4 corresponding to cell 3 have collided in a given subframe.

In FIG. 22, if a PUSCH is not transmitted, the mobile station device 1 for which simultaneous transmission of PUSCH and PUCCH has not been configured transmits the channel state information report of report type 3 corresponding to cell 1 and the channel state information report of report type 4 corresponding to cell 2 to the base station device 3 using resource 5 for PUCCH format 3. If a number of channel state information reports larger than two respectively corresponding to a number of cells larger than two have collided, the mobile station device 1 drops the channel state information reports until the number of channel state information reports becomes two, in accordance with the priorities of the report types and the cell indices of the cells.

More specifically, if a PUSCH is not transmitted and a number of channel state information reports larger than two respectively corresponding to a number of cells larger than two have collided in a given subframe, the mobile station device 1 for which simultaneous transmission of PUSCH and PUCCH has not been configured drops a channel state information report of a report type having low priority. If the report types of the channel state information have the same priority, the mobile station device 1 drops channel state information reports, starting from the channel state information report corresponding to a cell having a high cell index among the cells corresponding to the channel state information of the report types having the same priority. That is, if a PUSCH is not transmitted and a number of channel state information reports larger than two respectively corresponding to a number of cells larger than two have collided in a given subframe, the mobile station device 1 for which simultaneous transmission of PUSCH and PUSCH has not been configured transmits the channel state information report of a report type having high priority to the base station device 3. If the report types of the channel state information have the same priority, the mobile station device 1 transmits a channel state information report corresponding to a cell having a low cell index among the cells corresponding to the channel state information of the report types having the same priority to the base station device 3. For example, the mobile station device 1 first determines channel state information to be reported, by using report types of channel state information. If the report types of the channel state information have the same priority, the mobile station device 1 determines channel state information to be reported, by using cell indices.

The report type (3, 5, 6, or 2a) has higher priority than the report type (1, 1a, 2, 2b, 2c, or 4). That is, if a channel state information report of a given report type (3, 5, 6, or 2a) corresponding to a given cell and a channel state information report of a report type (1, 1a, 2, 2b, 2c, or 4) corresponding to a cell different from the given cell have collided, the mobile station device 1 preferentially drops the channel state information report of the report type (1, 1a, 2, 2b, 2c, or 4).

Furthermore, the report type (2, 2b, 2c, or 4) has higher priority than the report type (1 or 1a).

That is, if a channel state information report of a given report type (2, 2b, 2c or 4) corresponding to a given cell and a channel state information report of a report type (1 or 1a) corresponding to a cell different from the given cell have collided, the mobile station device 1 preferentially drops the channel state information report of the report type (1 or 1a).

Figure 23:
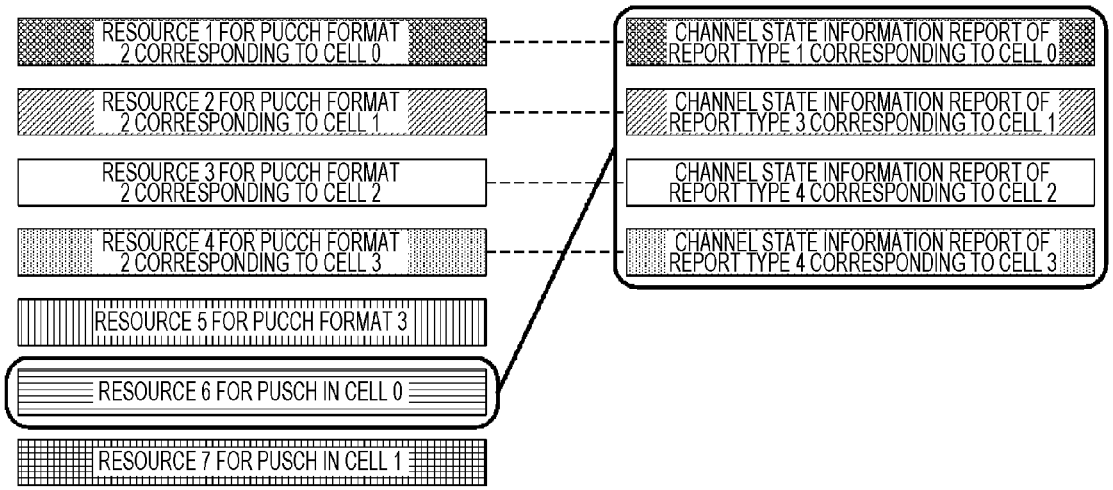
FIG. 23 is a diagram illustrating a third example of the correspondences between channel state information reports and physical uplink control channel resources of the present embodiment.

FIG. 23 is a diagram illustrating a third example of the correspondences between channel state information reports and physical uplink control channel resources of the present embodiment. In FIG. 23, a channel state information report of report type 1 corresponding to cell 0, a channel state information report of report type 3 corresponding to cell 1, a channel state information report of report type 4 corresponding to cell 2, and a channel state information report of report type 4 corresponding to cell 3 have collided in a given subframe. In FIG. 23, furthermore, the mobile station device 1 transmits a PUSCH in cell 0 and cell 1.

In FIG. 23, the mobile station device 1 for which simultaneous transmission of PUSCH and PUCCH has not been configured transmits all the channel state information reports corresponding to all the cells (cell 0 through cell 3) to the base station device 3 using the PUSCH for resource 6 in cell 0. Note that the mobile station device 1 for which simultaneous transmission of PUSCH and PUCCH has not been configured may drop some of the channel state information reports in accordance with the priorities of the report types and/or the cell indices, and may transmit the remaining channel state information reports on the PUSCH.

FIG. 24 is a flowchart diagram illustrating a process for determining a resource to be used for channel state information reporting of the present embodiment. The mobile station device 1 determines whether a plurality of channel state information reports of different report types corresponding to a given cell have collided (step S2400). The mobile station device 1 executes the determination of step S2400 for each of the plurality of cells. If a plurality of channel state information reports of different report types corresponding to a given cell have collided (Yes in step S2400), the mobile station device 1 drops a channel state information report of a report type having low priority, in accordance with the priorities of the report types, and causes the process to proceed to step S2404 (step S2402). If a plurality of channel state information reports of different report types corresponding to a given cell have not collided (No in step S2400), the mobile station device 1 causes the process to proceed to step S2404.

The mobile station device 1 determines whether simultaneous transmission of PUSCH and PUCCH has been configured (allowed) by the base station device 3 (step S2404). If simultaneous transmission of PUSCH and PUCCH has not been configured (allowed) by the base station device 3 (No in step S2404), the mobile station device 1 causes the process to proceed to step S2406. If simultaneous transmission of PUSCH and PUCCH has been configured (allowed) by the base station device 3 (Yes in step S2404), the mobile station device 1 causes the process to proceed to step S2408.

The mobile station device 1 determines whether to transmit at least one PUSCH in a given subframe (step S2406). If a PUSCH is not transmitted in a given subframe (No in step S2406), the mobile station device 1 causes the process to proceed to step S2408. The mobile station device 1 determines whether a plurality of channel state information reports corresponding to different cells have collided (step S2408). If a plurality of channel state information reports corresponding to different cells have not collided (No in step S2408), the mobile station device 1 transmits a single channel state information report using a resource for PUSCH format 2 corresponding to the single channel state information report (step S2410).

If a plurality of channel state information reports corresponding to different cells have collided (Yes in step S2408), the mobile station device 1 selects two channel state information reports in accordance with the priorities of the report types and the cell indices of the cells, and drops the other channel state information reports (step S2412). The mobile station device 1 transmits the two selected channel state information reports using the resource for PUCCH format 3, which is used in case of collision of a plurality of channel state information reports corresponding to different cells (step S2414).

If at least one PUSCH is transmitted (Yes in step S2406), the mobile station device 1 transmits one or more channel state information reports corresponding to one or more cells using a single PUSCH (step S2416). After step S2410, step S2414, or step S2416, the mobile station device 1 causes the channel state information report transmission process to end.

The base station device 3 identifies which cell the channel state information received using a PUCCH resource corresponds to, in accordance with the priorities of the report types and the cell indices. Furthermore, the base station device 3 is capable of identifying which PUCCH or PUSCH resource the mobile station device 1 will use to transmit channel state information, on the basis of the configured PUCCH-based periodic channel state information and the result of scheduling of the PUSCH.

PUCCH format 2 provides higher spectral efficiency than PUCCH format 3. In the present embodiment, when transmitting only a single channel state information report, the mobile station device 1 transmits channel state information using PUCCH format 2, which does not have the capability of transmitting a large number of bits. When transmitting a plurality of channel state information reports, the mobile station device 1 transmits channel state information using PUCCH format 3, which has the capability of transmitting a large number of bits. Accordingly, channel state information reports can be efficiently transmitted by changing the PUCCH format in accordance with the number of channel state information reports. In addition, if simultaneous transmission of PUSCH and PUCCH has not been configured and a PUSCH is to be transmitted, a plurality of pieces of channel state information can be transmitted using a PUSCH resource. Accordingly, a plurality of channel state information reports can be efficiently transmitted.

A second embodiment of the present embodiment will be described in detail hereinafter with reference to the drawings.

A base station device 3 of the second embodiment configures the mobile station device 1 with a resource for PUCCH format 2 or PUCCH format 3 for each of a plurality of cells. The base station device 3 of the first embodiment configures, for the mobile station device 1, periodic channel state information reports using a resource for PUCCH format 2 or PUCCH format 3 for each of a plurality of cells. Furthermore, the base station device 3 of the first embodiment transmits downlink control information, which is used for the scheduling of the PUSCH, to the mobile station device 1. The base station device 3 of the first embodiment further transmits information indicating whether or not simultaneous transmission of PUSCH and PUCCH has been configured to the mobile station device 1. For example, the base station device 3 configures the mobile station device 1 with a resource for PUCCH format 2 or PUCCH format 3, for each of a plurality of cells using a higher-layer signal (dedicated radio resource control information).

A mobile station device of the second embodiment applies the configuration of simultaneous transmission of PUSCH and PUCCH in accordance with the information indicating whether or not simultaneous transmission of PUSCH and PUCCH has been configured. If a PUSCH is not transmitted and a channel state information report using PUCCH format 2 or PUCCH format 3 has not collided with other channel state information reports in a given subframe, the mobile station device 1 of the second embodiment for which simultaneous transmission of PUSCH and PUCCH has not been configured transmits the channel state information report that has not collided to the base station device 3 using a resource for PUCCH format 2 or PUCCH format 3.

If a PUSCH is not transmitted and a channel state information report using PUCCH format 3 has collided with other channel state information reports in a given subframe, the mobile station device 1 of the second embodiment for which simultaneous transmission of PUSCH and PUCCH has not been configured transmits some or all of the plurality of channel state information reports that have collided to the base station device 3 using a resource for PUCCH format 3. For example, the other channel state information reports may include a channel state information report transmitted using a resource for PUCCH format 2. That is, if a channel state information report using a resource for PUCCH format 2 and a channel state information report using a resource for PUCCH format 3 have collided in a given subframe, the mobile station device 1 transmits some or all of the channel state information reports using the resource for PUCCH format 3.

If at least one PUSCH is transmitted and at least one channel state information report using PUCCH format 2 or PUCCH format 3 is present in a given subframe, the mobile station device 1 of the second embodiment for which simultaneous transmission of PUSCH and PUCCH has not been configured transmits part or whole of the at least one channel state information report to the base station device 3 using one PUSCH resource in the at least one PUSCH. In addition, if a channel state information report using PUCCH format 3 has collided in a plurality of cells, the mobile station device 1 of the second embodiment transmits some or all of the plurality of channel state information reports that have collided to the base station device 3 using a resource for PUCCH format 3 corresponding to a cell having the lowest cell index among the plurality of cells in which the channel state information reports have collided.

If a channel state information report using PUCCH format 2 or PUCCH format 3 has not collided with other channel state information reports in a given subframe, the mobile station device 1 of the first embodiment for which simultaneous transmission of PUSCH and PUCCH has been configured transmits the channel state information report that has not collided to the base station device 3 using a resource for PUCCH format 2 or PUCCH format 3.

If a channel state information report using PUCCH format 3 has collided with other channel state information reports in a given subframe, the mobile station device 1 of the first embodiment for which simultaneous transmission of PUSCH and PUCCH has been configured transmits some or all of the plurality of channel state information reports that have collided to the base station device 3 using a resource for PUCCH format 3.

FIG. 25 is a diagram illustrating an example of the encoding and modulation of a single piece of channel state information that is transmitted using PUCCH format 3 of the second embodiment. In FIG. 25, in a case where channel state information corresponding to a given cell is to be transmitted using a resource for PUCCH format 3, channel state information $o_i$ of up to 11 bits corresponding to the given cell is coded in accordance with Expression (3) and Expression (4) to obtain a coded bit sequence $q_i$ of 48 bits. (step S2500). In FIG. 25, the mobile station device 1 performs QPSK modulation on the coded bit sequence $q_i$ to obtain 24 modulation symbols d(i) (i=0, 1, . . . , 23) (step S2506).

$$q'_i = \Sigma_{n=0}^{O-1}(o_n \cdot M_{i,n}) \bmod 2 (i=0,1,\ldots,31) \qquad \text{[Math. 3]}$$

$$q_i = q'_{(i \bmod 32)} (i=0,1,\ldots,47) \qquad \text{[Math. 4]}$$

FIG. 26 is a diagram illustrating an example of configured periodic channel state information for cells 0 through 3 of the second embodiment. In FIG. 26, the type of PUCCH format (PUCCH format 2 or PUCCH format 3), the resource for PUCCH format 2/3, the reporting mode of channel state information, the offset of wideband/sub-band CQI, the period of wideband CQI, the period of sub-band CQI (only reporting mode 2-0 and mode 2-1), the offset of RI, and the period of RI are set for each of cells 0 through 3. In FIG. 26, resources 1 through 4 are resources of the primary cell (uplink primary component carrier). Comparing FIG. 19 with FIG. 26, there is a difference as follows: whereas in FIG. 19, the type of PUCCH format is not configured and periodic channel state information always using PUCCH format 2 is configured, in FIG. 26, the type of PUCCH format is configured.

Figure 27:
FIG. 27 is a diagram illustrating a first example of the correspondences between channel state information reports and physical uplink control channel resources of the second embodiment.

FIG. 27 is a diagram illustrating a first example of the correspondences between channel state information reports and physical uplink control channel resources of the second embodiment. FIG. 27 illustrates an example in which only a channel state information report of report type 1 corresponding to cell 0 is present in a given subframe. In FIG. 27, the mobile station device 1 transmits channel state information using resource 1 of PUCCH format 3 corresponding to cell 0.

Figure 28:
FIG. 28 is a diagram illustrating a second example of the correspondences between channel state information reports and physical uplink control channel resources of the second embodiment.

FIG. 28 is a diagram illustrating a second example of the correspondences between channel state information reports and physical uplink control channel resources of the second embodiment. FIG. 28 illustrates an example in which a channel state information report of report type 3 corresponding to cell 1 and a channel state information report of report type 4 corresponding to cell 3 have collided in a given subframe. In FIG. 28, the mobile station device 1 drops the channel state information report of report type 4 corresponding to cell 3 in accordance with the priorities of the report types, and transmits the channel state information of report type 3 corresponding to cell 4 using resource 2 of PUCCH format 2 corresponding to cell 4.

Figure 29:
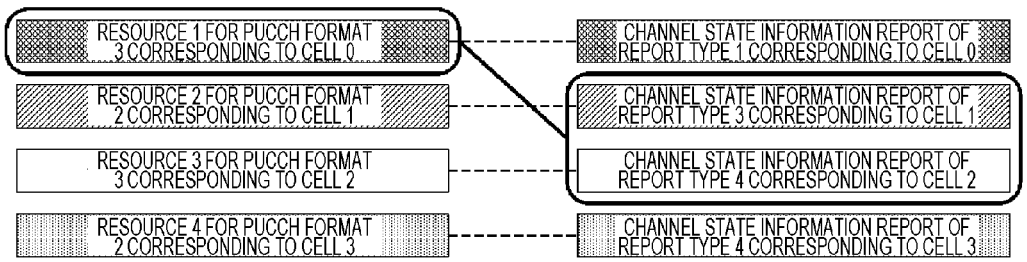
FIG. 29 is a diagram illustrating a third example of the correspondences between channel state information reports and physical uplink control channel resources of the second embodiment.

FIG. 29 is a diagram illustrating a third example of the correspondences between channel state information reports and physical uplink control channel resources of the second embodiment. An example is illustrated in which a channel state information report of report type 1 corresponding to cell 0, a channel state information report of report type 3 corresponding to cell 1, a channel state information report of report type 4 corresponding to cell 2, and a channel state information report of report type 4 corresponding to cell 3 have collided in a given subframe. In FIG. 28, the mobile station device 1 drops the channel state information report of report type 1 corresponding to cell 0 and the channel state information report of report type 4 corresponding to cell 3 in accordance with the priorities of the report types, and transmits the channel state information report of report type 1 corresponding to cell 1 and the channel state information report of report type 4 corresponding to cell 2 using resource 1 of PUCCH format 3 corresponding to cell 0.

In the first embodiment, the base station device 3 configures the mobile station device 1 with a resource for PUCCH format 2 for each cell and with one resource for PUCCH format 3. That is, the base station device 3 needs to configure the mobile station device 1 with a number of PUCCH resources larger than the number of cells by one. In the second embodiment, however, the base station device 3 configures a resource for PUCCH format 2 or PUCCH format 3 for each cell. Thus, the base station device 3 may configure the mobile station device 1 with PUCCH resources, the number of which is equal to the number of cells, and can accordingly efficiently configure PUCCH resources.

Channel state information reports of different report types corresponding to a given cell may be transmitted using a PUSCH or PUCCH format 3 resource. That is, the processing of step S2400 and step S2402 in FIG. 24 may be skipped.

The base station device 3 may configure a resource for PUCCH format 2 or PUCCH format 3 and periodic channel state information reports for each cell group including one or more cells. Accordingly, a resource for PUCCH format 3 may be associated with transmissions of channel state information for a plurality of cells.

A program operating on the base station device 3 and the mobile station device 1 according to the present invention may be a program for controlling a CPU (Central Processing Unit) or the like (a program for causing a computer to function) to implement the functions of the foregoing embodiments of the present invention. The information handled by these devices is temporarily accumulated in a RAM (Random Access Memory) when processed, and is then stored in various ROMs such as a Flash ROM (Read Only Memory) or an HDD (Hard Disk Drive). The information is read and modified or written by the CPU, if necessary.

Part of the mobile station device 1 and the base station device 3 in the foregoing embodiments may be implemented by a computer. In this case, part of the mobile station device 1 and the base station device 3 may be implemented by recording on a computer-readable recording medium a program for implementing the control function therefor, loading the program recorded on the recording medium into a computer system, and executing the program.

The term "computer system", as used herein, refers to a computer system incorporated in the mobile station device 1 or the base station device 3, and is used to include an OS and hardware such as peripheral devices. The term "computer-readable recording medium" refers to a portable medium such as a flexible disk, a magneto-optical disk, a ROM, or a CD-ROM, or a storage device incorporated in a computer system, such as a hard disk.

Furthermore, the term "computer-readable recording medium" may also be used to include an object that dynamically holds a program for a short period of time, like a communication wire for transmitting the program via a network such as the Internet or a communication line such as a telephone line, and an object that holds a program for a certain period of time, such as an internal volatile memory of a computer system serving as a server or a client in that case. Furthermore, the program described above may be configured to implement some of the functions described above, or may be implemented by combining the functions described above with a program already recorded on a computer system.

Furthermore, a part or whole of the mobile station device 1 and the base station device 3 in the foregoing embodiments may be implemented as an LSI, which is typically an integrated circuit, or as a chip set. The functional blocks of the mobile station device 1 and the base station device 3 may be individually built into chips, or some or all thereof may be integrated and built into a chip. The method of forming an integrated circuit is not limited to LSI, and may be implemented by a dedicated circuit or a general-purpose processor. In case of the advent of integrated circuit technology replacing LSI due to the advancement of semiconductor technology, it is also possible to use an integrated circuit based on this technology.

While some embodiments of this invention have been described in detail with reference to the drawings, a specific configuration is not limited to that described above, and a variety of design modifications and the like can be made without departing from the essence of this invention.

REFERENCE SIGNS LIST 1 (1A, 1B, 1C) mobile station device
3 base station device
101 higher layer processing unit
103 control unit
105 receiving unit
107 transmitting unit
301 higher layer processing unit
303 control unit
305 receiving unit
307 transmitting unit
1011 radio resource control unit
1013 scheduling information interpretation unit
1015 channel state information selection unit
3011 radio resource control unit
3013 scheduling unit
3015 control information generation unit

The invention claimed is:

1. A mobile station device that communicates with a base station device by using a plurality of cells, comprising:
measuring circuitry that calculates channel state information, and
transmitting circuitry that:
(i) transmits, in a case that (a) simultaneous physical uplink control channel and physical uplink shared channel transmission is not configured, (b) a first physical uplink control channel resource is configured, and (c) there is one periodic channel state information report in a subframe where the physical uplink shared channel is not transmitted, the one periodic channel state information report on at least one of a plurality of second physical uplink control channel resources, one of the plurality of second physical uplink control channel resources being configured for each of the plurality of cells; and
(ii) transmits, in a case that (a) the simultaneous physical uplink control channel and physical uplink shared channel transmission is not configured, (b) the first physical uplink control channel resource is configured, and (c) there are two periodic channel state information reports in the subframe where the physical uplink shared channel is not transmitted, one or two of the two periodic channel state information reports on the first physical uplink control channel resource, the first physical uplink control channel resource being used for transmission of a first physical uplink control channel format, the each of the plurality of second physical uplink control channel resources being used for transmission of a second physical uplink control channel format, and in a case that the simultaneous physical uplink control channel and physical uplink shared channel transmission is not configured, the transmitting circuitry transmits one or more of the periodic channel state information reports on the physical uplink shared channel in a subframe where the physical uplink shared channel is transmitted.

2. The mobile station device according to claim 1, wherein the first physical uplink control channel format is used to transmit more than one periodic channel state information reports, and the second physical uplink control channel format is used to transmit one periodic channel state information report.

3. The mobile station device according to claim 1, wherein the first physical uplink control channel format is used to transmit more than 20 bits, and the second physical uplink control channel format is used to transmit 20 bits.

4. A base station device that communicates with a mobile station device by using a plurality of cells comprising:

control circuitry that:

configures a first physical uplink control channel resource used for transmission of a first physical uplink control channel format, and configures each of a plurality of second physical uplink control channel resources used for transmission of a second physical uplink control channel format, and receiving circuitry that:

(i) receives, in a case (a) simultaneous physical uplink control channel and physical uplink shared channel transmission is not configured in the mobile station device, (b) the first physical uplink control channel resource is configured, and (c) there is one periodic channel state information report in a subframe where the physical uplink shared channel is not transmitted, the one periodic channel state information report on at least one of the plurality of second physical uplink control channel resources, one of the plurality of second physical uplink control channel resources being configured for each of the plurality of cells; and (ii) receives, in a case that (a) the simultaneous physical uplink control channel and physical uplink shared channel transmission is not configured in the mobile station device, (b) the first physical uplink control channel resource is configured, and (c) there are two periodic channel state information reports in the subframe where the physical uplink shared channel is not transmitted, one or two of the two periodic channel state information reports on the first physical uplink control channel resource, and in a case that the simultaneous physical channel and physical uplink shared channel transmission is not configured in the mobile station device the receiving circuitry receives one or more of the periodic channel state information reports on the physical uplink shared channel in a subframe where the physical uplink shared channel is transmitted.

5. The base station device according to claim 4, wherein the first physical uplink control channel format is used to receive more than one periodic channel state information reports, and the second physical uplink control channel format is used to receive one periodic channel state information report.

6. The base station device according to claim 4, wherein the first physical uplink control channel format is used to receive more than 20 bits, and the second physical uplink control channel format is used to receive 20 bits.

7. A wireless communication method used in a mobile station device that communicates with a base station device by using a plurality of cells, comprising:

calculating channel state information, transmitting, in a case that (a) simultaneous physical uplink control channel and physical uplink shared channel transmission is not configured, (b) a first physical uplink control channel resource is configured, and (c) there is one periodic channel state information report in a subframe where the physical uplink shared channel is not transmitted, the one periodic channel state information report on at least one of a plurality of second physical uplink control channel resources, one of the plurality of second physical uplink control channel resources being configured for each of the plurality of cells, and transmitting, in a case that (a) the simultaneous physical uplink control channel and physical uplink shared channel transmission is not configured, (b) the first physical uplink control channel resource is configured, and (c) there are two periodic channel state information reports in the subframe where the physical uplink shared channel is not transmitted, one or two of the more than one periodic channel state information reports on the first physical uplink control channel resource, the first physical uplink control channel resource being used for transmission of a first physical uplink control channel format, each of the plurality of second physical uplink control channel resources being used for transmission of a second physical uplink control channel format, and in a case that the simultaneous physical uplink control channel and physical uplink shared channel transmission is not configured, one or more of the periodic channel state information reports on the physical uplink shared channel are transmitted in a subframe where the physical uplink shared channel is transmitted.

8. A wireless communication method used in a base station device that communicates with a mobile station device by using a plurality of cells, comprising:

configuring a first physical uplink control channel resource used for transmission of a first physical uplink control channel format;

configuring each of a plurality of second physical uplink control channel resources used for transmission of a second physical uplink control channel format;

receiving, in a case that (a) simultaneous physical uplink control channel and physical uplink shared channel transmission is not configured in the mobile station device, (b) the first physical uplink control channel resource is configured, and (c) there is one periodic channel state information report in a subframe where the physical uplink shared channel is not transmitted, the one periodic channel state information report on at least one of the plurality of second physical uplink control channel resources, one of the plurality of second physical uplink control channel resources being configured for each of the plurality of cells; and receiving, in a case that (a) the simultaneous physical uplink control channel and physical uplink shared channel transmission is not configured in the mobile station device, (b) the first physical uplink control channel resource is configured, and (c) there are two periodic channel state information reports in the subframe where the physical uplink shared channel is not transmitted, one or two of the two periodic channel state information reports on the first physical uplink control channel resource, and in a case that the simultaneous physical channel and physical uplink shared channel transmission is not configured in the mobile station device, one or more of the periodic channel state information reports on the physical uplink shared channel are received in a subframe where the physical uplink shared channel is transmitted.

* * * * *